(12) United States Patent
Ihara

(10) Patent No.: US 7,480,930 B2
(45) Date of Patent: Jan. 20, 2009

(54) DATA TRANSMISSION AND RECEPTION SYSTEM

(75) Inventor: Yushi Ihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 899 days.

(21) Appl. No.: 09/890,894

(22) PCT Filed: Dec. 6, 2000

(86) PCT No.: PCT/JP00/08632

§ 371 (c)(1),
(2), (4) Date: Jan. 9, 2002

(87) PCT Pub. No.: WO01/43432

PCT Pub. Date: Jun. 14, 2001

(65) Prior Publication Data

US 2002/0162102 A1    Oct. 31, 2002

(30) Foreign Application Priority Data

Dec. 9, 1999  (JP) .................................. 11/350865

(51) Int. Cl.
*H04N 7/16*   (2006.01)
*G06F 15/00*  (2006.01)
*G06K 1/00*   (2006.01)
*G06K 15/02*  (2006.01)

(52) U.S. Cl. ..................... 725/141; 725/153; 358/1.2

(58) Field of Classification Search .................... 725/80, 725/141, 153; 358/1.2
See application file for complete search history.

(56) References Cited

U.S. PATENT DOCUMENTS

| 6,018,816 A * | 1/2000 | Tateyama ................... 714/746 |
| 6,172,765 B1 * | 1/2001 | Kawamoto .................. 358/1.2 |
| 6,282,597 B1 * | 8/2001 | Kawamura .................. 710/105 |
| 6,430,635 B1 * | 8/2002 | Kwon et al. ................. 710/104 |
| 6,559,971 B1 * | 5/2003 | Watts et al. .................. 358/1.2 |
| 6,665,088 B1 * | 12/2003 | Chiba et al. ................ 358/1.17 |
| 7,062,579 B2 * | 6/2006 | Tateyama et al. ........... 710/104 |

FOREIGN PATENT DOCUMENTS

| EP | 0 884 880 | 12/1998 |
| JP | 7 66846 | 3/1995 |
| JP | 10 210046 | 8/1998 |
| JP | 10 229544 | 8/1998 |
| JP | 10-229544 | 8/1998 |
| JP | 10-341247 | 12/1998 |

* cited by examiner

*Primary Examiner*—Christopher Kelley
*Assistant Examiner*—Justin E Shepard
(74) *Attorney, Agent, or Firm*—Frommer Lawrence & Haug LLP; William S. Frommer; Paul A. Levy

(57) ABSTRACT

A command packet C2 comprehending a version command, the profile of which is to be checked, from a data source (STB) to a data destination side (printer device) and a response packet R2 including the profile information as the search result is transmitted from the data destination side to the data source side, which then transmits a data packet S2 including the picture data conforming to the profile information to the data destination side. Thus, the status of a controlled device can be checked by a control device in a shorter time.

7 Claims, 25 Drawing Sheets

| | pixel_x | pixel_y | interlaced/ progressive | pixel format | screen aspect ratio | pixel aspect ratio | based standard | image size |
|---|---|---|---|---|---|---|---|---|
| 1080_422_16×9 | 1920 | 1080 | interlaced/ progressive | YCbCr 4:2:2 | 16:9 | 1:1 | ITU-R BT. 709-2 | 3.96MB |
| 1080_420_16×9 | 1920 | 1080 | interlaced/ progressive | YCbCr 4:2:0 | 16:9 | 1:1 | ITU-R BT. 709-2 | 2.97MB |
| 720_422_16×9 | 1280 | 720 | progressive | YCbCr 4:2:2 | 16:9 | 1:1 | ANSI/SMP TE 296 M-1997 | 1.76MB |
| 720_420_16×9 | 1280 | 720 | progressive | YCbCr 4:2:0 | 16:9 | 1:1 | ANSI/SMP TE 296 M-1997 | 1.32MB |
| 576_422_4×3 | 720 | 576 | interlaced/ progressive | YCbCr 4:2:2 | 4:3 | 1.07:1 | ITU-R BT.1203 | 810KB |
| 576_420_4×3 | 720 | 576 | interlaced/ progressive | YCbCr 4:2:0 | 4:3 | 1.07:1 | ITU-R BT.1203 | 608KB |
| 480_422_16×9 | 720 | 480 | interlaced/ progressive | YCbCr 4:2:2 | 16:9 | 1.19:1 | ITU-R BT. 709-2 | 675KB |
| 480_420_16×9 | 720 | 480 | interlaced/ progressive | YCbCr 4:2:0 | 16:9 | 1.19:1 | ITU-R BT. 709-2 | 506KB |
| 480_422_4×3 | 720 | 480 | interlaced/ progressive | YCbCr 4:2:2 | 4:3 | 0.89:1 | ITU-R BT.601-4 | 575KB |
| 480_420_4×3 | 720 | 480 | interlaced/ progressive | YCbCr 4:2:0 | 4:3 | 0.89:1 | ITU-R BT.601-4 | 506KB |

FIG.7

| | msb | | | | | | lsb |
|---|---|---|---|---|---|---|---|
| opcode | \multicolumn{7}{c}{VERSION($44_{16}$)} |
| operand [0] | \multicolumn{7}{c}{reserved} |
| operand [1] | \multicolumn{7}{c}{printer subunit version} |
| operand [2] | \multicolumn{7}{c}{implementation profile id} |
| operand [3] | \multicolumn{7}{c}{reserved} |
| operand [4] | | | | | | | |

FIG.8

| printer_subunit_version | Meaning |
|---|---|
| $00_{16}$ | Version 1.0 of the printer subunit specification |
| all others | Reserved for future specification. |

FIG.9

| implementation_profile_id | Meaning |
|---|---|
| $00_{16}$ | Minimum |
| $01_{16}$ | DSC |
| $02_{16}$ | DTV |
| $03_{16}$ | DSC&DTV |

FIG.10

|  | sRGB | YCC4:2:2 raw/chunky/ progressive | YCC4:2:0 raw/chunky/ progressive | Exit2.1 | Unit Plug Defined(DV) | Unit Plug Defined (MPEG2-TS) |
|---|---|---|---|---|---|---|
| 640 × 480 | △○☆◎ |  |  | ☆◎ |  |  |
| 720 × 480 |  | ○◎ | ○◎ |  |  |  |
| 720 × 576 |  | ○◎ | ○◎ |  |  |  |
| 800 × 600 | ☆◎ |  |  | ◎ |  |  |
| 1024 × 768 | ☆◎ |  |  | ☆◎ |  |  |
| 1280 × 960 | ☆◎ |  |  | ☆◎ |  |  |
| 1280 × 720 |  | ○◎ | ○◎ |  |  |  |
| 1600 × 1200 |  |  |  |  |  |  |
| 1920 × 1080 |  | ○◎ | ○◎ |  |  |  |

△ : Minimum  ☆ : DSC  ○ : DTV  ◎ : DSC&DTV

FIG.11

| | msb | | | | | | lsb |
|---|---|---|---|---|---|---|---|
| opcode | \multicolumn{7}{c}{CAPTURE($42_{16}$)} |
| operand [0] | \multicolumn{7}{c}{subfunction} |
| operand [1] | \multicolumn{5}{c}{source_subunit_type} | \multicolumn{2}{c}{source_subunit_ID} |
| operand [2] | \multicolumn{7}{c}{source_plug} |
| operand [3] | \multicolumn{7}{c}{status} |
| operand [4] | \multicolumn{7}{c}{dest_plug} |
| operand [5] | | | | | | | |
| ⋮ | \multicolumn{7}{c}{print_job_ID} |
| operand [16] | | | | | | | |
| operand [17] | | | | | | | |
| operand [18] | \multicolumn{7}{c}{data_size} |
| operand [19] | | | | | | | |
| operand [20] | | | | | | | |
| operand [21] | \multicolumn{7}{c}{image_size_x} |
| operand [22] | | | | | | | |
| operand [23] | \multicolumn{7}{c}{image_size_y} |
| operand [24] | | | | | | | |
| operand [25] | \multicolumn{7}{c}{image_format_specifier} |
| operand [26] | | | | | | | |
| operand [27] | | | | | | | |
| operand [28] | \multicolumn{7}{c}{reserved} |
| operand [29] | | | | | | | |
| operand [30] | \multicolumn{7}{c}{next_pic} |
| operand [31] | \multicolumn{7}{c}{next_page} |
| operand [32] | | | | | | | |

FIG.12

| Value | Symbol | Meaning |
|---|---|---|
| $01_{16}$ | get | Get the current operation modes |
| $02_{16}$ | set | Set the specified operation modes |
| $03_{16}$ | query | Get the supported operation modes |
| Other values | – | Reserved |

FIG.13

| value | Type | Meaning |
|---|---|---|
| $20_{16}$ | 1080i _ 422chunky _ 16×9 | |
| $21_{16}$ | 1080p _ 422chunky _ 16×9 | |
| $22_{16}$ | 720p _ 422chunky _ 16×9 | |
| $23_{16}$ | 480I _ 422chunky _ 16×9 | |
| $24_{16}$ | 480p _ 422chunky _ 16×9 | |
| $25_{16}$ | 480I _ 422chunky _ 4×3 | |
| $26_{16}$ | 480p _ 422chunky _ 4×3 | |
| $28_{16}$ | 1080i _ 422liner _ 16×9 | |
| $29_{16}$ | 1080p _ 422liner _ 16×9 | |
| $2A_{16}$ | 720p _ 422liner _ 16×9 | |
| $2B_{16}$ | 480I _ 422liner _ 16×9 | |
| $2C_{16}$ | 480p _ 422liner _ 16×9 | |
| $2D_{16}$ | 480I _ 422liner _ 4×3 | |
| $2E_{16}$ | 480p _ 422liner _ 4×3 | |
| $30_{16}$ | 1080i _ 420planer _ 16×9 | |
| $31_{16}$ | 1080p _ 420planer _ 16×9 | |
| $32_{16}$ | 720p _ 420planer _ 16×9 | |
| $33_{16}$ | 480I _ 420planer _ 16×9 | |
| $34_{16}$ | 480p _ 420planer _ 16×9 | |
| $35_{16}$ | 480I _ 420planer _ 4×3 | |
| $36_{16}$ | 480p _ 420planer _ 4×3 | |
| $38_{16}$ | 1080i _ 420liner _ 16×9 | |
| $39_{16}$ | 1080p _ 420liner _ 16×9 | |
| $3A_{16}$ | 720p _ 420liner _ 16×9 | |
| $3B_{16}$ | 480I _ 420liner _ 16×9 | |
| $3C_{16}$ | 480p _ 420liner _ 16×9 | |
| $3D_{16}$ | 480I _ 420liner _ 4×3 | |
| $3E_{16}$ | 480p _ 420liner _ 4×3 | |
| $60_{16}$ | Text(ASCII) | MD-clip ASCII |
| $61_{16}$ | Text(ISO8859-1) | MD-clip modified ISO8859-1 |
| $62_{16}$ | Text(Music Shifted JIS) | MD-clip Music Shifted JIS |

FIG.14

| Value(MSB) | Value(LSB) | Type | Meaning |
|---|---|---|---|
| $00_{16}$ | $00_{16}$ | sRGB raw | sRGB raw |
| | $01_{16}$ | sRGB raw,quadlet | |
| $01_{16}$ | | | YCC raw |
| | $0X_{16}$ | YCC4:2:2 raw/pixel | |
| | $1X_{16}$ | YCC4:2:2 raw/line | |
| | $8X_{16}$ | YCC4:2:0 raw/pixel | |
| | $9X_{16}$ | YCC4:2:0 raw/line | |
| | $X0_{16}$ | Pixel ratio 1.00 x 1.00 / ITU-R BT.709-2 / interlace | |
| | $X1_{16}$ | Pixel ratio 1.19 x 1.00 / ITU-R BT.709-2 / interlace | |
| | $X2_{16}$ | Pixel ratio 0.89 x 1.00 / ITU-R BT.709-2 / interlace | |
| | $X3_{16}$ | Pixel ratio 0.89 x 1.00 / ITU-R BT.601-4 / interlace | |
| | $X4_{16}$ | Pixel ratio 1.07 x 1.00 / ITU-R BT.1203 / interlace | |
| | $X8_{16}$ | Pixel ratio 1.00 x 1.00 / ITU-R BT.709-2 / progressive | |
| | $X9_{16}$ | Pixel ratio 1.19 x 1.00 / ITU-R BT.709-2 / progressive | |
| | $XA_{16}$ | Pixel ratio 0.89 x 1.00 / ITU-R BT.709-2 / progressive | |
| | $XB_{16}$ | Pixel ratio 0.89 x 1.00 / ITU-R BT.601-4 / progressive | |
| | $XC_{16}$ | Pixel ratio 1.07 x 1.00 / ITU-R BT.1203 / progressive | |
| $10_{16}$ | $00_{16}$ | Exif 2.1 | DCF Object |
| | $01_{16}$ | JFIF | |
| | $02_{16}$ | TIFF | |
| | $0F_{16}$ | JPEG | |
| $80_{16} \sim 8F_{16}$ | $00_{16} \sim FF_{16}$ | Vendor Dependent format | |
| $FE_{16}$ | $00_{16}$ | Unit Plug defined | Special meaning |
| | $01_{16}$ | don't care | |

FIG.15

| $Y_1(L_1)$ | $Y_2(L_1)$ | $Cb_1(L_1)$ | $Cr_1(L_1)$ |
|---|---|---|---|
| $Y_3(L_1)$ | $Y_4(L_1)$ | $Cb_3(L_1)$ | $Cr_3(L_1)$ |
| | | ⋮ | |
| $Y_{N-1}(L_1)$ | $Y_N(L_1)$ | $Cb_{N-1}(L_1)$ | $Cr_{N-1}(L_1)$ |
| $Y_1(L_2)$ | $Y_2(L_2)$ | $Cb_1(L_2)$ | $Cr_1(L_2)$ |
| | | ⋮ | |
| $Y_{N-1}(L_M)$ | $Y_N(L_M)$ | $Cb_{N-1}(L_M)$ | $Cr_{N-1}(L_M)$ |

FIG.16

| $Y_1(L_1)$ | $Y_2(L_1)$ | $Y_1(L_2)$ | $Y_2(L_2)$ |
|---|---|---|---|
| $Cb_1(L_1)$ | $Cr_1(L_1)$ | $Y_3(L_1)$ | $Y_4(L_1)$ |
| $Y_3(L_2)$ | $Y_4(L_2)$ | $Cb_3(L_1)$ | $Cr_3(L_1)$ |
| | | ⋮ | |
| $Y_{N-3}(L_{M-1})$ | $Y_{N-2}(L_{M-1})$ | $Y_{N-3}(L_M)$ | $Y_{N-2}(L_M)$ |
| $Cb_{N-3}(L_{M-1})$ | $Cr_{N-3}(L_{M-1})$ | $Y_{N-1}(L_{M-1})$ | $Y_N(L_{M-1})$ |
| $Y_{N-1}(L_M)$ | $Y_N(L_M)$ | $Cb_{N-1}(L_{M-1})$ | $Cr_{N-1}(L_{M-1})$ |

FIG.17

| $Y_1(L_1)$ | $Y_2(L_1)$ | $Y_3(L_1)$ | $Y_4(L_1)$ |
|---|---|---|---|
| ⋮ | ⋮ | ⋮ | ⋮ |
| $Y_{N-3}(L_1)$ | $Y_{N-2}(L_1)$ | $Y_{N-1}(L_1)$ | $Y_N(L_1)$ |
| $Cb_1(L_1)$ | $Cr_1(L_1)$ | $Cb_3(L_2)$ | $Cr_3(L_1)$ |
| ⋮ | ⋮ | ⋮ | ⋮ |
| $Cb_{N-3}(L_M)$ | $Cr_{N-3}(L_1)$ | $Cb_{N-1}(L_1)$ | $Cr_{N-1}(L_1)$ |
| $Y_1(L_2)$ | $Y_2(L_2)$ | $Y_3(L_1)$ | $Y_4(L_1)$ |
| ⋮ | ⋮ | ⋮ | ⋮ |
| $Cb_{N-3}(L_M)$ | $Cr_{N-3}(L_M)$ | $Cb_{N-1}(L_M)$ | $Cr_{N-1}(L_M)$ |

FIG.18

| $Y_1(L_1)$ | $Y_2(L_1)$ | $Y_3(L_1)$ | $Y_4(L_1)$ |
|---|---|---|---|
| | ⋮ | | |
| $Y_{N-3}(L_1)$ | $Y_{N-2}(L_1)$ | $Y_{N-1}(L_1)$ | $Y_N(L_1)$ |
| $Y_1(L_2)$ | $Y_2(L_2)$ | $Y_3(L_2)$ | $Y_4(L_2)$ |
| | ⋮ | | |
| $Y_{N-3}(L_2)$ | $Y_{N-2}(L_2)$ | $Y_{N-1}(L_2)$ | $Y_N(L_2)$ |
| $Cb_1(L_1)$ | $Cr_1(L_1)$ | $Cb_3(L_1)$ | $Cr_3(L_1)$ |
| | ⋮ | | |
| $Cb_{N-3}(L_1)$ | $Cr_{N-3}(L_1)$ | $Cb_{N-1}(L_1)$ | $Cr_{N-1}(L_1)$ |
| $Y_1(L_3)$ | $Y_2(L_3)$ | $Y_3(L_3)$ | $Y_4(L_3)$ |
| | ⋮ | | |
| $Cb_{N-3}(L_{M-1})$ | $Cr_{N-3}(L_{M-1})$ | $Cb_{N-1}(L_{M-1})$ | $Cr_{N-1}(L_{M-1})$ |

FIG.19

| Address Offset | 1st byte | 2nd byte | 3rd byte | 4th byte |
|---|---|---|---|---|
| 00 00 00 00$_{16}$ | Y1(L1) | Y2(L1) | Cb1(L1) | Cr1(L1) |
| 00 00 00 04$_{16}$ | Y3(L1) | Y4(L1) | Cb3(L1) | Cr3(L1) |
| ⋮ | ⋮ | | | |
| 00 00 05 9C$_{16}$ | Y719(L1) | Y720(L1) | Cb719(L1) | Cr719(L1) |
| 00 00 05 A0$_{16}$ | Y1(L2) | Y2(L2) | Cb1(L2) | Cr1(L2) |
| ⋮ | ⋮ | | | |
| 00 0A 8B FC$_{16}$ | Y719(L480) | Y720(L480) | Cb719(L480) | Cr719(L480) |

FIG.20

| Address Offset | 1st byte | 2nd byte | 3rd byte | 4th byte |
|---|---|---|---|---|
| 00 00 00 00$_{16}$ | Y1(L1) | Y2(L1) | Y1(L2) | Y2(L2) |
| 00 00 00 04$_{16}$ | Cr1(L1) | Cr1(L1) | Y3(L1) | Y4(L1) |
| 00 00 00 08$_{16}$ | Y3(L2) | Y4(L2) | Cb3(L1) | Cr3(L1) |
| ⋮ | | ⋮ | | |
| 00 07 E8 F8$_{16}$ | Cb717(L479) | Cr717(L479) | Y719(L479) | Y720(L479) |
| 00 07 E8 FC$_{16}$ | Y719(L480) | Y720(L480) | Cb719(L479) | Cr719(L479) |

FIG.21

| Address Offset | 1st byte | 2nd byte | 3rd byte | 4th byte |
|---|---|---|---|---|
| 00 00 00 00$_{16}$ | Y1(L1) | Y2(L1) | Y3(L1) | Y4(L1) |
| ⋮ | | ⋮ | | |
| 00 00 02 CF$_{16}$ | Y717(L1) | Y718(L1) | Y719(L1) | Y720(L1) |
| 00 00 02 D0$_{16}$ | Cb1(L1) | Cr1(L1) | Cb3(L1) | Cr3(L1) |
| ⋮ | | ⋮ | | |
| 00 00 05 9F$_{16}$ | Cb717(L1) | Cr717(L1) | Cb719(L1) | Cr719W(L1) |
| 00 00 05 A0$_{16}$ | Y1(L2) | Y2(L2) | Y3(L2) | Y4(L2) |
| ⋮ | | ⋮ | | |
| 00 0A 8B FC$_{16}$ | Cb717(L480) | Cr717(L480) | Cb719(L480) | Cr719(L480) |

FIG.22

| Address Offset | 1st byte | 2nd byte | 3rd byte | 4th byte |
|---|---|---|---|---|
| 00 00 00 00$_{16}$ | Y1(L1) | Y2(L1) | Y3(L1) | Y4(L1) |
| ⋮ | | ⋮ | | |
| 00 00 02 CF$_{16}$ | Y717(L1) | Y718(L1) | Y719(L1) | Y720(L1) |
| 00 00 02 D0$_{16}$ | Y1(L2) | Y2(L2) | Y3(L2) | Y4(L2) |
| ⋮ | | ⋮ | | |
| 00 00 05 9F$_{16}$ | Y717(L2) | Y718(L2) | Y719(L2) | Y720(L2) |
| 00 00 05 A0$_{16}$ | Cb1(L1) | Cr1(L1) | Cb3(L1) | Cr3(L1) |
| ⋮ | | ⋮ | | |
| 00 00 08 6F$_{16}$ | Cb717(L1) | Cr717(L1) | Cb719(L1) | Cr719(L1) |
| 00 00 08 70$_{16}$ | Y1(L3) | Y2(L3) | Y3(L3) | Y4(L3) |
| ⋮ | | ⋮ | | |
| 00 07 E8 FC$_{16}$ | Cb717(L479) | Cr717(L479) | Cb719(L479) | Cr719(L479) |

FIG.23

DATA TRANSMISSION AND RECEPTION SYSTEM

TECHNICAL FIELD

This invention relates to a data reception device, a data transmission device, a data processing method and a data transmission/reception system, employed with advantage in a system configured for processing a picture between a control device connected in circuit through an interface conforming to the IEEE 1394 (The International Electrical and Electronics Engineers) standard and a controlled device.

BACKGROUND ART

The IEEE (The Institute of Electrical and Electronics Engineers)1394 standard provides for physical and electrical standards of connectors provided on interconnection to respective equipments. The equipments having interfaces conforming to the IEEE 1394 standard can be physically interconnected to realize e.g., Hot Plug and Play adapted for automatically transmitting/receiving digital data speedily or establishing interconnection among different equipment. This is currently being accepted as a serial interface standard providing a criterium for the pertinent business circles.

It has recently been proposed in 1394 TRADE ASSOCIATION to receive printing data from an external network circuit by a set top box (STB) to print the data by a printer connected to the STB over the IEEE 1394 cable.

If, with the STB/DTV connected to the printer device, picture data acquired by the STB/DTV is to be printed using picture data acquired in the STB/DTV, the processing shown in FIG. 1 is carried out.

Referring to FIG. 1, the STB/DTV transmits a command packet C101, comprehending a command (SUBUNIT_INFO) inquiring into the information such as the type of the subunit (interfacing portion or picture processing portion) of the printing device, and receives a corresponding response packet R101. This permits the STB/DTV to recognize that the printing device is able to perform printing using the picture data.

Then, in order to verify whether or not printing with the image size and the image type at the time of printing can be made, the STB/DTV queries the printing device as to the form of printing.

At this time, the STB/DTV transmits to the printing device a capture command C102, inclusive of the information inquiring into whether or not the image size it is in need of is being coped with (SPECIFIC INQUIRY) to acquire the result of search comprehended in the response packet R102. The printing device 5 reads-in the corresponding portion (info block) of the subunit identity descriptor stated in itself to store the read-in portion as being the result of check in the response packet R102.

The STB/DTV then transmits to the printing device a capture command C103, comprehending the information inquiring into whether or not the image type it is in need of is coped with (SPECIFIC INQUIRY) to acquire the result of check included in the response packet R103.

This permits the STB/DTV to recognize whether or not the image size and the image sort it is in need of are coped with in the printing device.

However, if, in the above-described STB/DTV and the printing device, performing the processing described with reference to FIG. 1, the processing of querying the printing device as to two items of requests, namely the image size and the image sort, is to be performed, it is necessary that a packet for inquiring into whether or not the image sort is coped with be transmitted/received, and that a packet for inquiring into whether or not the image sort is coped with be then transmitted/received. That is, command and response packets need to be exchanged twice (C102 to R103).

Thus, a complicated processing sequence and prolonged processing time are needed for the STB/DTV to check into the printing device.

Moreover, dedicated descriptor accessing means need to be loaded for reading-in the subunit identity descriptor. In addition, the subunit identity descriptor is occasionally of a variable length, such that the processing of making analysis by descriptor accessing means sometimes becomes complex. On the other hand, the descriptor accessing means permits variable read-in methods, such as quadlet read, block read or offset utilization, and hence it is necessary to support respective read-in methods.

The present Applicant proposed the contents of the Japanese Patent Application No.H11-350865, which is the base of priority of the present application, to the IEEE 1394 Trade Association for standardization at suitable timing, and the contents of the proposal are made public as the following drafts by the IEEE 1394 Trade Association:

AV/C Printer Subunit Specification Version 1.0, Draft 0.97: 60 (2Q00 AVWG Off-Cycle Meeting on May 24-25, 2000);

AV/C Printer Subunit Specification Version 1.0, Draft 0.7: 5 (1Q00 TA QM AV-WG on Jan. 18, 2000); and AV/C Printer Subunit Specification Version 1.0, Draft 0.5: 145 (3Q99 TA QM AVWG Meeting on Jul. 28-30, 1999).

DISCLOSURE OF THE INVENTION

It is therefore an object of the present invention to provide a data receiving method, a data transmitting device, a data processing method and a data transmitting/receiving system which permit the control device to check into the state of the controlled device in a shorter time.

In one aspect, the present invention provides a data reception apparatus including picture processing means for doing pre-set picture processing using picture data from a data source side, input/output means for being fed from the data source side with picture data comprehended in a packet conforming to the IEEE (The Institute of Electrical and Electronics Engineers) 1394 standard and for outputting a response packet responsive to a command packet conforming to the IEEE 1394 standard from the data source side, and control means for controlling the input/output means to transmit to the data source side the profile information indicating a profile coped with by the picture processing means, as search results, responsive to the inputting of a command for searching a profile to the input/output means.

In another aspect, the present invention provides a data processing method in doing pre-set picture processing using picture data from a data source side, including a step of being fed from the data source side with picture data comprehended in a packet conforming to the IEEE (The Institute of Electrical and Electronics Engineers) 1394 standard, a step of outputting a response packet responsive to a command packet conforming to the IEEE 1394 standard from the data source side, and a step of transmitting to the data source side the profile information indicating a profile coped with, as search results, responsive to the inputting of a command packet for searching the profile of processable picture data.

In still another aspect, the present invention provides a data transmission device including picture processing means for processing picture data input from outside to generate picture data, input/output means for outputting the picture data generated by the picture processing means as the picture data is comprehended in a packet conforming to the IEEE (The Institute of Electrical and Electronics Engineers) 1394 standard, and control means for managing control for generating a command packet for searching a profile coped with by picture data outputting destination to output the generated command packet from the input/output means to a data reception side, the control means also managing control for changing the type of the picture data output by the input/output means based on the profile information specifying the search results from the data reception side.

In still another aspect, the present invention provides a data processing method including a step of processing picture signals input from outside to generate picture data, a step of outputting the picture data generated as the picture data is comprehended in a packet conforming to the IEEE (The Institute of Electrical and Electronics Engineers) 1394 standard, a step of generating a command packet for searching a profile coped with by picture data outputting destination to output the generated command packet to a data reception side, and a step of managing control for changing the type of the picture data output based on the profile information specifying the search results transmitted from the data reception side.

In still another aspect, the present invention provides a data transmission/reception system comprising a data transmission device and a data reception device, in which the data transmission device includes first picture processing means for processing picture signals input from outside to generate picture data, first input/output means for outputting the picture data generated by the first picture processing means to a picture reception device as the picture data generated is comprehended in a packet conforming to the IEEE (The Institute of Electrical and Electronics Engineers) 1394 standard, and first control means for managing control for generating a command packet for searching a profile coped with by picture data reception device to output the generated command packet from the input/output means to the data reception device, the control means also managing control for changing the type of the picture data output by the first input/output means based on the profile information specifying the search results from the data reception side, and in which the data reception device includes second input/output means for receiving picture data from the first input/output means as the picture data is comprehended in a packet conforming to the IEEE (The Institute of Electrical and Electronics Engineers) 1394 standard, and for outputting a response packet responsive to the command packet conforming to the IEEE (The Institute of Electrical and Electronics Engineers) 1394 standard from the first input/output means, second picture, processing means for performing pre-set picture processing using the picture data input by the second picture processing means and second control means for controlling the second input/output means, responsive to inputting to the second input/output means of a command for searching a profile from the first input/output means, for outputting the profile information indicating the profile coped with by the picture processing means, as search results, to the data transmitting device.

BRIEF DESCRIPTION OF THE DRAWINGS

FIG. 7 illustrates an image type of a still picture.

FIG. 8 shows a data structure of a version command comprehended in a command packet.

FIG. 9 illustrates the contents of the information on the subunit specifications.

FIG. 10 illustrates the contents of the profile information.

FIG. 11 illustrates the image type and the image size supported in each setting.

FIG. 12 illustrates a data structure of a capture command comprehended in a command packet.

FIG. 13 illustrates the contents stored in the subfunction.

FIG. 14 illustrates the appellation of the image type stored in image_format_specifier.

FIG. 15 illustrates another typical image type stored in image_format_specifier.

FIG. 16 illustrates the transmission order of pixel data in point-sequential transmission of static image data with a pixel format of YCC 4:2:2 to the printer device.

FIG. 17 illustrates the transmission order of pixel data in point-sequential transmission of static image data with a pixel format of YCC 4:2:0 to the printer device.

FIG. 18 illustrates the transmission order of pixel data in line-sequential transmission of static image data with a pixel format of YCC 4:2:2 to the printer device.

FIG. 19 illustrates the transmission order of pixel data in line-sequential transmission of static image data with a pixel format of YCC 4:2:0 to the printer device.

FIG. 20 illustrates how a still picture with the image type of 480_422_4×3 is transmitted point-sequentially.

FIG. 21 illustrates how a still picture with the image type of 480_420_4×3 is transmitted point-sequentially.

FIG. 22 illustrates how a still picture with the image type of 480_422_4×3 is transmitted line-sequentially.

FIG. 23 illustrates how a still picture with the image type of 480_420_4×3 is transmitted line-sequentially.

BEST MODE FOR CARRYING OUT THE INVENTION

Figure 1:
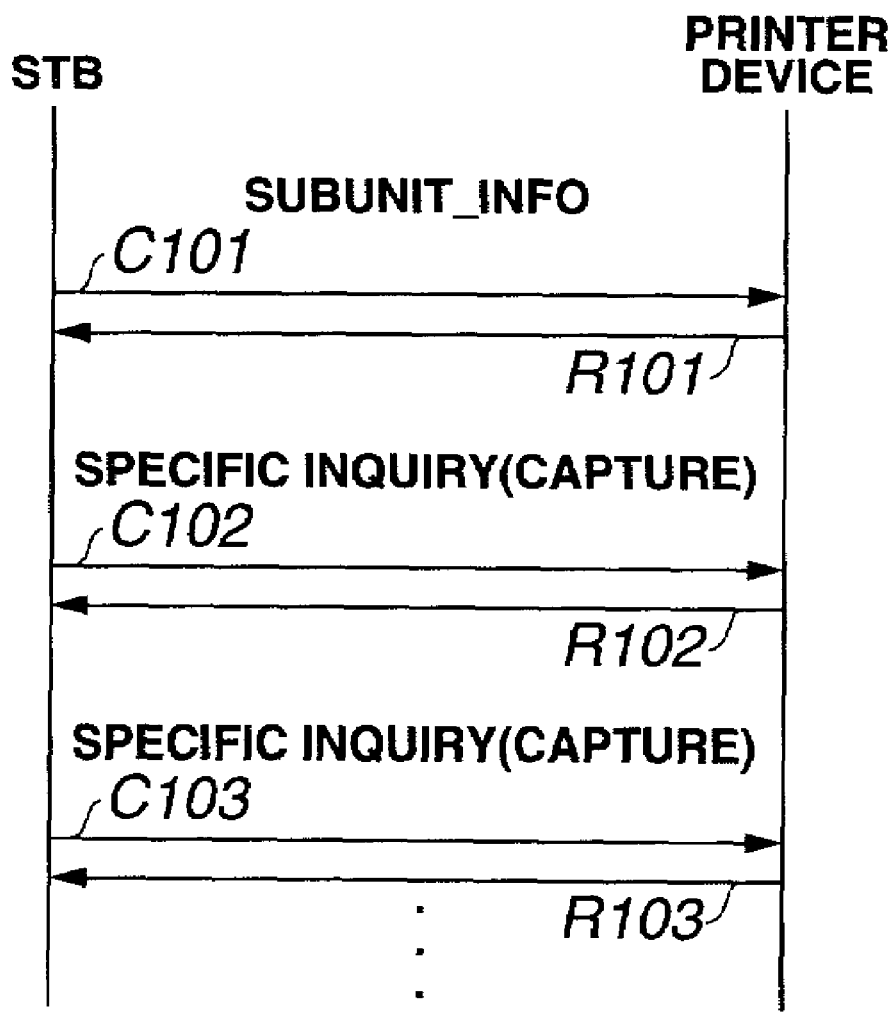
FIG. 1 shows the conventional processing sequence for the STB/DTV to check into the supporting state of the printing device.

Referring to the drawings, preferred embodiments of the present invention will be explained in detail.

Figure 2:
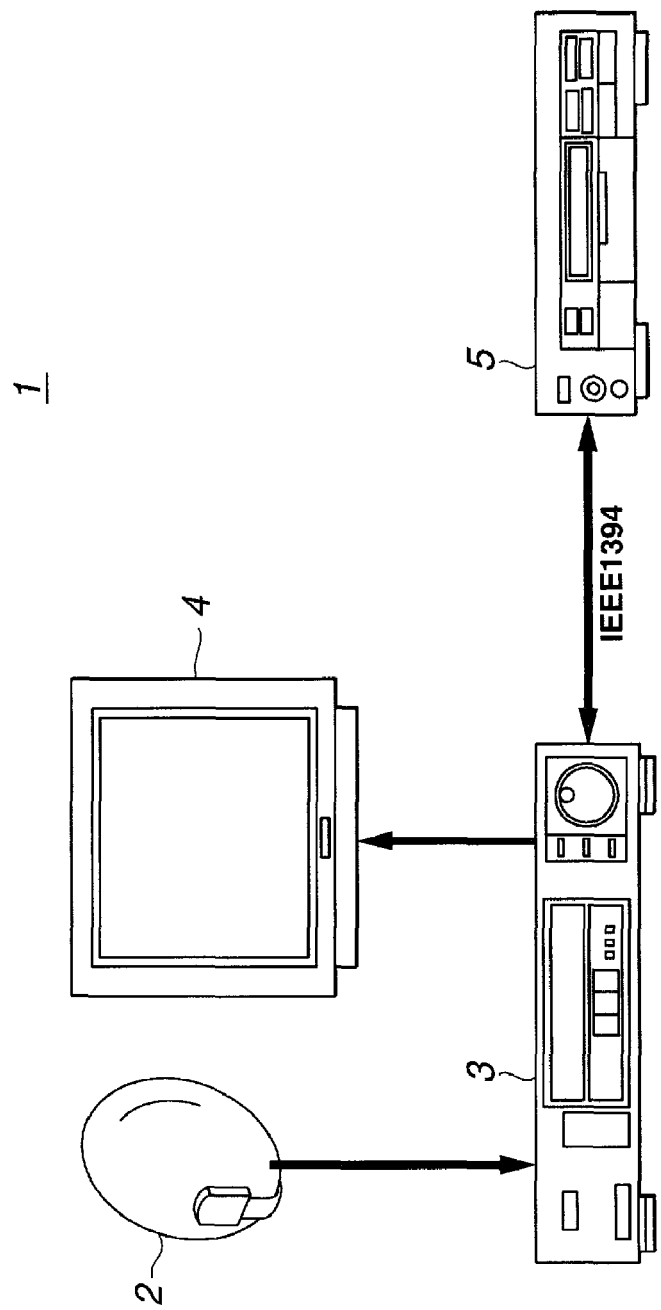
FIG. 2 shows a picture printing system embodying the present invention.

A picture printing system embodying the present invention is configured as shown for example in FIG. 2.

This picture printing system 1 is made up of an antenna 2 for receiving a moving picture broadcast using e.g., a communication satellite, a set top box (STB) 3 for performing pre-set signal processing on received moving picture data, a television device 4 for demonstrating a moving picture and a still picture and a printing device 5 for printing and outputting a picture.

The antenna 2 receives picture signals representing a moving picture to output the received picture signals to the STB 3. The picture signals, received over the antenna 2, are made up of multi-channel picture signals, superimposed together. More specifically, the picture signals are comprised of moving picture data compressed in accordance with e.g., MPEG (Moving Picture Experts Group) and encrypted in accordance with a pre-set encryption system.

The television device 4 is fed through the STB 3 with moving picture data of the NTSC (National television System Committee) system to display a moving picture. Moreover, in case of HDTV, the television device 4 is fed from the STB 3 with moving picture data conforming to the HD (High Definition) standard to display a moving picture. Moreover, the television device 4 has its display state controlled by the STB 3 to display a still picture or other teletext information.

Figure 3:
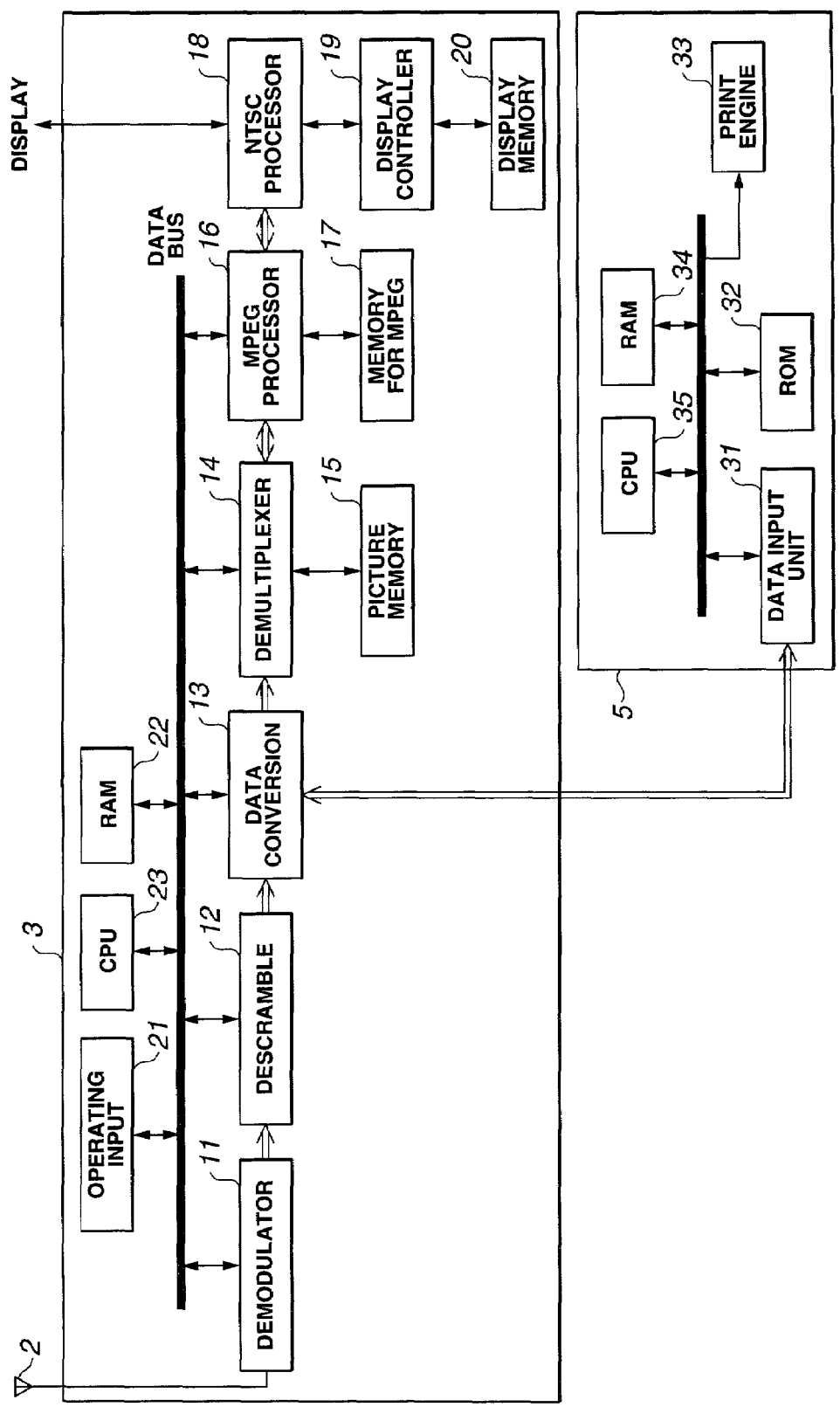
FIG. 3 is a block diagram showing the structure of an STB and a printing device making up a picture printing system according to the present invention.

Referring to FIG. 3, the STB 3 includes a demodulator 11 for demodulating picture signals received over the antenna 2, a descrambler 12 for decoding the moving picture data, a data conversion unit 13 for doing data conversion conforming to the IEEE 1394 standard, a demultiplexer 14 for doing the processing such as extracting moving picture data in a pre-set channel, a picture memory 15, an MPEG processor 16 for doing e.g., decoding, an NTSC encoder 18 for doing conversion to data displayed on a screen in the television device 4, and a display controller 19. The STB 3 also includes an operating input unit 21, fed with a command by a user, a RAM (random access memory) 22 and a central processing unit (CPU) 23 for controlling various units.

In this STB 3, the demodulator 11, descrambler 12, data conversion unit 13, demultiplexer 14, MPEG processor 16, operating input unit 21, RAM (random access memory) 22 and the CPU 23 are connected to a bus, over which the processing operations of various components are controlled by the CPU 23.

The demodulator 11 is fed from the antenna 2 with picture signals of the analog system indicating e.g., a moving picture stream. This demodulator 11 performs demodulation and A/D (analog to digital) conversion on the picture signals from the antenna 2 to output the resulting signals to the descrambler 12 as moving picture data. The demodulator 11 is also fed over a bus with control signals from the CPU 23 to perform the demodulation and the A/D conversion based on these control signals.

The descrambler 12 decodes the moving picture data from the demodulator 11. That is, the descrambler 12 is fed with encrypted moving picture data to perform decoding in accordance with the encryption system of the input moving picture data. The descrambler 12 outputs the decoded moving picture data to the data conversion unit 13. The descrambler 12 is fed over the bus with control signals from the CPU 23 and performs decoding using the encryption key contained in the control signals.

The data conversion unit 13 is comprised e.g., of an interfacing circuit conforming to the IEEE 1394 standard and is responsive to the control signal from the CPU 23 to perform signal processing conforming to the IEEE 1394 standard on the moving picture data from the descrambler 12 to perform the processing of including the input moving or still picture data into a packet conforming to the IEEE 1394 standard. If temporally continuous data, such as moving picture data, is to be transmitted, the data conversion unit 13 generates an isochronous packet, whereas, if still picture data for printing by the printing device 5 or still data such as commands or data for connection setting, the data conversion unit 13 performs the processing of generating an asynchronous packet 100.

Figures 4, 5:
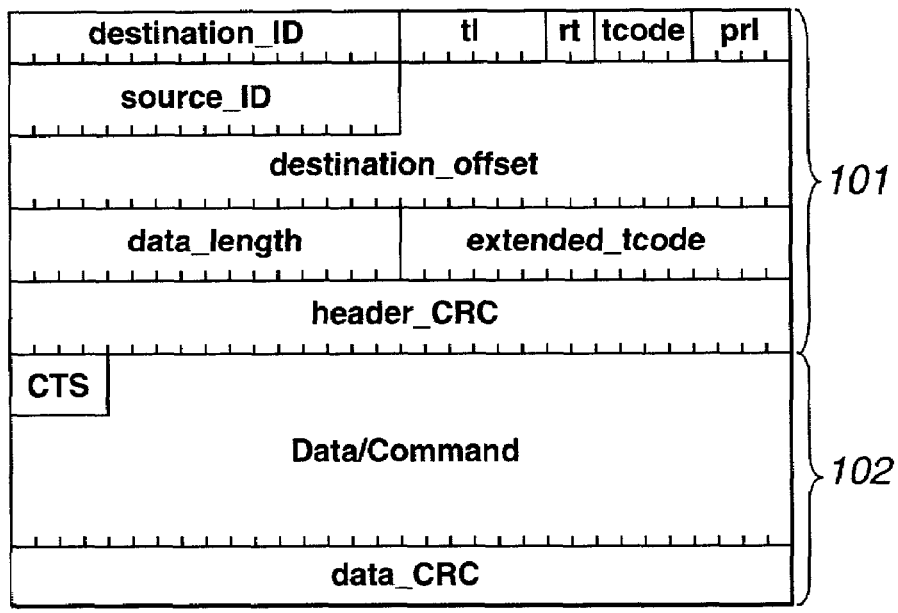
FIG. 4 shows the data structure of an asynchronous packet transmitted/received between an STB and a printing device.
FIG. 5 shows a data structure of a data portion of an asynchronous packet.

The asynchronous packet 100, shown in FIG. 4, includes a header 101 and a data part 102 conforming to the IEEE 1394 standard.

In the header 101 are stored an ID on the packet receiving side, that is an ID of the printing device 5 (destination_ID), a transaction label (tl: transaction label), a retry code (rt: retry code), a transaction code (tcode: transaction code), priority (pri: priority), an ID on the packet transmitting side, that is source ID indicating an ID of the STB 3 (source_ID), destination_offset, indicating a memory address on the packet receiving side, a data field length (data_length), extended transaction code (extended_tcode), and a header CRC (header_CRC: CRC of the header field) for the header part 101.

In the data part 102, there are stored a data field, in which to store data in accordance with FCP (function control protocol) and with AV/C protocol, and a data CRC (data_CRC) indicating the CRC for the header part 101.

In the data field are stored, as the information conforming to FCP, a command transaction set (CTS), a command type (c:type), a subunit type (subunit_type) indicating the sort of the sub-unit on the packet receiving side, and a sub-unit ID indicating the packet receiving side sub-unit (subunit_ID), as shown in FIG. 5. To a sub-unit on the packet receiving side corresponds a data input unit 31 of the printing device 13. The kind of the sub-units on the packet receiving side is represented as "00010" for the printing device 5.

Next to the subunit ID, the opcode, indicating the sort of the operations, and the operands [0] to [n], indicating an object of the operations, are stored, in the data field, in order to store an AV/C command for the printing device 5. In these operands are stored still picture data (data) transmitted to the printing device 5 and AV/C commands for the printing device 5. The commands stored in the data field are those comprehended in a command set, termed AV/C commands, used for controlling the printing device 5. The above-mentioned CTS classifies the FCPs, so that, if a transmitted packet is a command, and has a value of 0000, an AV/C command, defined in the AV/C Digital Interface Command Set of the IEEE 1394, is stored in the data part 102.

When outputting an isochronous packet to outside, the data conversion unit 13 transmits isochronous packets at regular intervals.

Figure 6:
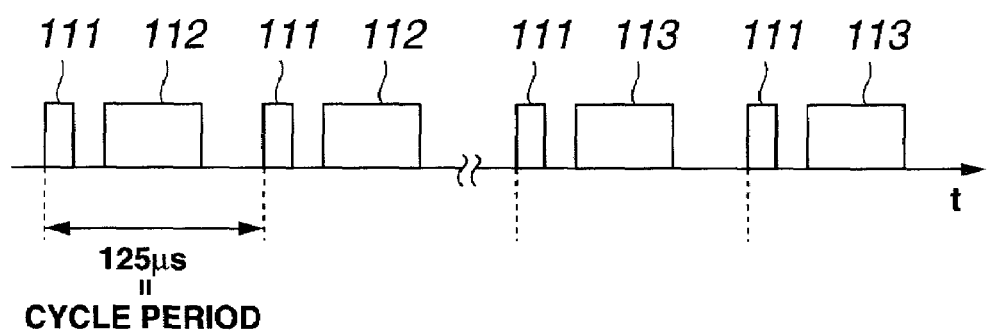
FIG. 6 is a time chart for asynchronous packet transmission from a data outputting unit to a data input unit.

If the data conversion unit 13 transmits an asynchronous packet 100 as still picture data for printing by the printing device 5 comprehended therein, it transmits the asynchronous packet 100 at a cycle period of 125 μsec, as shown in FIG. 6. It is noted that the data conversion unit 13 first transmits a cycle start packet 111, which is an asynchronous packet 100 comprehending cycle time data (cycle_time_data) indicating a cycle start (cycle_start) in a header part 101 and, after lapse of a pre-set time gap, transmits a command packet 112 comprehending in a data part 102 a capture command indicting the purport of transmitting e.g., still picture data. The data conversion unit 13 then transmits, at each cycle period, a data packet 113, having still picture data stored in its data part 102, to the printing device 5 which has received the capture command.

It is noted that, when outputting still picture data to the printing device 5, the data conversion unit 13 observes the asynchronous arbitration. That is, when outputting still picture data to the printing device 5, the data conversion unit 13 transmits each asynchronous packet 100, inclusive of the still picture data, in accordance with the response from the printing device 5.

Specifically, the data conversion unit 13 performs the processing in the transaction layer, link layer and in the physical layer, under serial bus supervision conforming to the IEEE 1394 standard. So, the data conversion unit 13 establishes the interconnection to the printing device 5, under control by the CPU 23, while generating an asynchronous packet 100, inclusive of the still picture data and the overhead as the control information, and transmitting asynchronous packets 100 to the printing device 5, connected thereto in accordance with the IEEE 1394 standard, every cycle period, by way of performing time division control.

When directly displaying moving picture data, received by the STB 3, that is without performing the processing conforming to the IEEE 1394 standard by the television device 4, the data conversion unit 13 outputs the moving picture data from the descrambler 12 to the demultiplexer 14, based on the control signal from the CPU 23.

The demultiplexer 14 performs a channel sorting processing of sorting out a channel specified by the CPU 23, from plural channels superposed on moving picture data from the data conversion unit 13, to output only the moving picture data, indicating the specified channel, to the MPEG processor 16.

The demultiplexer 14 is fed with still picture data, made up of the luminance information and the chroma information, from the MPEG processor 16, under control by the CPU 23, memorizes the still picture data in the picture memory 15 and outputs the stored data to the data conversion unit 13 under control by the CPU 23.

Based on the control signal from the CPU 23, the MPEG processor 16 performs decoding processing, in accordance with the MPEG standard, on the moving picture data from the demultiplexer 14, to output the resulting non-compressed moving picture data to the NTSC encoder 18. So, the MPEG processor 16 formulates a picture, comprised of pixel data, including the luminance information (Y) and chroma information (Cr, Cb), referred to below as a YCC picture, from respective frames making up a moving picture. It is noted that the MPEG processor 16 incidentally stores plural frame-based moving picture data, as an object of decoding, in a memory for MPEG 17, for use as a work area.

The MPEG processor 16 generates the YCC picture of a pixel format such that the sampling frequency ratio of the luminance information Y, chroma information Cr and the chroma information Cb is set to 4:2:2, that is such that the chroma information Cr, Cb is reduced in the horizontal or vertical direction to one half of the luminance information Y. Also, the MPEG processor 16 generates a YCC picture of a 4:2:0 pixel format such that the chroma information Cr, Cb is reduced in both the horizontal and vertical directions to one half of the luminance information Y. It is noted that, in the 4:2:0 pixel format, the odd line is devoid of the chroma information Cb to give a sampling frequency ratio of 4:2:0, while the even line is devoid of the chroma information Cr to give a sampling frequency ratio of 4:0:2. This format, however, is expressed as 4:2:0 which is the former ratio. It is possible for the MPEG processor 16 to generate a YCC picture not only of the pixel format of 4:2:2 or 4:2:0 but also of the pixel format of 4:4:4 in which the chroma information is not curtailed.

The MPEG processor 16 also performs the encoding processing, conforming to the MPEG standard, on the moving picture data from the NTSC encoder 18, based on the control signal representing e.g., the compression ratio from the CPU 23, to compress the moving picture data in the temporal and spatial directions, to output the resulting compressed data to the demultiplexer 14. The MPEG processor 16 performs the processing of storing plural-frame-based moving picture data for encoding processing in the memory for MPEG 17.

The NTSC encoder 18 performs encoding processing to formulate moving picture data of the NTSC system, which can be displayed on a screen by the television device 4, from the moving picture data input from the MPEG processor 16, to output the resulting data on the television device 4.

The display controller 19 performs the processing of displaying the moving picture data of the NTSC system by the NTSC encoder 18 on the television device 4. At this time, the display controller 19 incidentally stores the data for processing in a display memory 20.

Specifically, the display controller 19 performs the processing of providing a picture size for display with 720 by 480 pixels of the NTSC system or the 1920 horizontal pixels by 1080 vertical pixels of the HD (high definition) system, depending on the television device 4, as a picture size for display on the television device 4, in terms of a frame constituting moving picture data as a unit. In generating one-pixel data, the display controller 19 performs the processing of outputting the 16-bit information with the pixel format in which the sampling frequency ratio of the luminance signal Y, chroma signals Cr and the chroma signals Cb is set to 4:2:2, or the information with the pixel format in which the sampling frequency ratio of the luminance signal Y, chroma signals Cr and the chroma signals Cb is set to 4:2:0, to the television device 4.

The display controller 19 may be used not only in case the above-described system of outputting to the television device 4 is used, but also in case a picture of the image type, in which the picture size (pixel_x, pixel_y), the scanning system (interlace/progressive), pixel format (pixel—format), screen aspect ratio (screen_aspect_ratio), pixel aspect ratio and the image size are defined, is to be produced, as shown in FIG. 7. In this figure, such an image type in which the pixel_y is 720 pixels, the pixel format is 4:2:2 and the screen aspect ratio is 16:9, is termed 720_422_16×9. It is noted that the display controller 19 is also able to generate a picture of 720_422_16×9 and 720_420_16×9, as image types of the digital TV broadcast system used in USA, and to generate a picture of 576_422_4×3 and a picture of 522_420_4×3 as image types of the PAL (phase alternation by line) system.

On user actuation of e.g., an actuating button provided on the STB 3, the operating input unit 21 generates an operating input signal to output the generated signal to the CPU 23. Specifically, the operating input unit 21 transiently halts the moving picture displayed by the user on the television device 4 to generate an operating input signal for printing a still picture by the printing device 5.

Based on e.g., an operating input signal from the operating input unit 21, the CPU 23 generates a control signal for controlling the above-mentioned various parts making up the STB 3.

When the picture signals received e.g., over the antenna 2 are to be displayed on the television device 4, the CPU 23 outputs control signals to the demodulator 11, descrambler 12, data conversion unit 13, demultiplexer 14 and to the MPEG processor 16 to manage control to demodulate and decrypt moving picture data, perform channel sorting processing on and to decode the moving picture data in accordance with the MPEG standard.

If frame-based still pictures, among the moving pictures displayed on the television device 4 by the operating input signal from the operating input unit 21, are to be captured, the CPU 23 generates control signals to read in the frame-based still picture data, stored in the display memory 20 at a time point of inputting the operating input signal, into the picture memory 15.

If an operating input signal for printing a picture generating the still picture data by the printing device 5 is input, the CPU 23 controls the demultiplexer 14 and the data conversion unit 13 to output the YCC picture, made up of the luminance information Y and the chroma information Cr, Cb, and which is the frame-based still picture data stored in the picture memory 15, to the printing device 5 through the data conversion unit 13, which is an interfacing circuit conforming to the IEEE 1394 standard.

If still picture data is to be transmitted to the printing device 5, under control by the CPU 23, the data conversion unit 13 transmits, next to the subunit ID shown in FIG. 5, the asynchronous packet 100, having stored therein a capture command as later explained with reference to FIG. 8, to transmit a capture command for receiving the still picture data to the printing device 5.

For introducing categorization of the destination of transmission, as a premise for transmitting picture data from the STB 3 to the printing device 5, the data conversion unit 13 formulates a version command for checking into the profile information. The data conversion unit 13, issuing the version command to acquire a response from the source of transmission, acquires the information that can be coped with by the source of transmission of picture data, here the printing device 5, to check into the picture data for transmission.

Next, the printing device 5 is explained.

Referring to FIG. 3, the printing device 5 includes a data input unit 31 for inputting still picture data from the printing device 5, a ROM (read-only memory) 32, having stored therein the printing control program, a print engine 33 for printing on a support, a RAM 34, and a CPU 35 for controlling various components.

The data input unit 31 is comprised of an interfacing circuit conforming e.g., to the IEEE 1394 standard and, responsive to a control signal from the CPU 35, performs signal processing conforming to the IEEE 1394 standard on still picture data comprehended in the asynchronous packet 100 from the STB 3.

Specifically, the data input unit 31 performs processing in a transaction layer, a link layer and in a physical layer, under serial bus management conforming to the IEEE 1394 standard. This permits the data input unit 31 to output still picture data comprehended in the asynchronous packet 100 to the CPU 35.

The data input unit 31 also performs the setting with the data conversion unit 13 of the STB 3, for interconnection for transmitting/receiving the asynchronous packet 100 between it and the printing device 5, such as when the data input unit 31 is mechanically coupled to the STB 3 over e.g., an optical cable.

The print engine 33 is made up of a printing support holding/driving mechanism, a printer head, a printer head driving mechanism and so forth, and prints a still picture on a support, under control by the CPU 35.

The CPU 35 generates a control signal for controlling the data input unit 31 and the print engine 33. At this time, the CPU 35 operates in accordance with a printing control program stored in the ROM 32, while controlling the contents of the RAM 34, using the RAM 34 as a working area.

If fed from the data input unit 31 with a command for supplying the profile information from the data conversion unit 13, the CPU 35 routes the profile information, specifying processing contents executable on the print control program, to the data input unit 31 or to the print engine 33.

Referring to FIG. 8, a version command generated in the data conversion unit 13 is explained.

In the version command packet, $44_{16}$ in hex indicating a version command is represented as an opcode (operation code). The operand [0] then is set to Reserved, the subunit specification information (printer_subunit_version) of the printing device 5 is stored in the operand [1], and the profile information (implementation_profile_id) is stored as the operand [2] and the operands [3]~[4] are set to Reserved.

The above subunit specifications information indicates the version information of the destination of data transmission for the STB 3. The subunit specification information represents the version information pertinent to the picture processing function and the printing function of the printing device 5.

The subunit specification information is stated by the data input unit 31 as shown in FIG. 9 and input to the data conversion unit 13 as a response packet. In FIG. 9, if the operand [1] is stated as [00] in hex, the data conversion unit 13 recognizes that the picture processing function and the printing function of the printing device 5 is of the specifications prescribed in version 1.0 specifications. If the operand [1] is stated in a value other than [00], it indicates that it copes with other specifications. That is, a value other than [00] is associated with other specifications proposed in future.

The profile information denotes the type of the picture data that can be coped with by the printing device 5. The profile information is divided into the minimum setting information (minimum), DSC setting information, DTV (digital television) setting information, DSC and DTV setting information.

The profile information is stated by the data input unit 31 as shown in FIG. 10 and input as a response packet to the data conversion unit 13. Referring to FIG. 10, if [00] in hex is stated in the operand [2], the data conversion unit 13 recognizes that the printing device 5 is at the minimum setting. If [01], [02] and [03] are stated in the operand [2], the data conversion unit 13 recognizes that the printing device 5 is at the DSC setting, at the DTV setting and at the DSC and DTV setting, respectively.

The data conversion unit 13 has a table shown in FIG. 11 and, responsive to the setting of the printing device 5, recognized from the response packet, recognizes the profile coped with by the printing device 5. This data conversion unit 13 is responsive to the contents stated in the operand [2] of the reference picture indicating the search result to recognize the image size and the image type (image format type) supported by the printing device 5. For example, if the data conversion unit 13 recognizes that the printing device 5 is at the minimum setting, from the statement of [00] in the operand [2] of the response packet from the printing device 5, the data input unit 31 recognizes that only the 640 pixel by 480 pixel picture data of the sRGB form is coped with by the printing device 5.

Referring to FIG. 12, the capture command, generated by the data conversion unit 13 and transmitted to the data input unit 31, is hereinafter explained.

In a capture command packet, a capture command, expressed in $XX_{16}$ in hex notation, is stored as an opcode (operation code). Next, the subfunction information is stored as the operand [0], the source subunit type information (source_subunit_type) and the source subunit ID information (source_subunit_ID) are stored as the operand [1] in upper three bits and in lower three bits, respectively, the source plug information (source_plug) is stored as the operand [2], the status information is stored as the operand [3], and the destination plug information (dest_plug) is stored as the operand [4]. In a capture command, the job ID information (print_job_ID) is stored as operands [5] to [16], data size information [data_size] is stored as the operands [17] to [20], the image size information [image_size_x] is stored as the operands [21] to [22], the image size information [image_size_y] is stored as the operands [23] to [24], the image format information (image_format_specifier) is stored as the operands [25] to [26], the operands [27] to [29] are reserved, the picture number information (next_pic) specifying the picture number for printing is stored as the operand [30] and the page number information (next_page) specifying the page number for printing is stored as the operands [31] to [32]. In this picture printing system 1, the job means processing contents throughout the data transmission processing and printing processing and is comprised of at least one page. The page is comprehended in the job and indicates a processing unit performed on a sole printing medium, such as a printing sheet, performed on the job. The page is comprised of at least one page. The picture indicates a processing unit comprehended in a page and which is obtained on splitting each page. Specifically, the page denotes a processing unit performed on one picture pattern comprehended in a printing medium.

Referring to FIG. 13, the subfunction information (subfunction) may be enumerated by the information expressed by 01 in hex notation and termed "get", the information expressed by 02 in hex notation and termed "set", information expressed by 03 in hex notation and termed "query".

The data conversion unit 13 sets the subfunction to [01 (get)], [02(set)] and [03(query)] when acquiring the operation 2 parameter indicating the print setting information of the printing device 5, when setting the operation mode 2 parameter of the printing device 5 and when desirous to be apprised of the settable range of the operation mode 2 parameter of the printing device 5. If the subfunction is other than 01, 02 or 03 in hex notation (other values), the subfunction is Reserved.

The source subunit type information [source_subunit_type] is the information specifying the type of the subunit to which the STB 3 transmits the asynchronous packet 100, the source subunit ID information [source_subunit_ID] is an ID of the subunit transmitting the asynchronous packet 100, the source plug information (source_plug) is the plug number of the subunit to which the asynchronous packet 100 is transmitted, the reception side plug information (dest—plug) is a plug number of the subunit receiving the asynchronous packet 100, the job ID information (print_job_ID) is an ID of the processing (job) of printing a sole still picture, the data size information (data—size) is the amount of data transmitted from the STB 3 to the printing device 5 when printing a still picture on the printing device 5, the image size information (image_size_x) is the number of pixels in the x-direction, corresponding to the image type shown in FIG. 7, the image size information (image_size_y) is the number of pixels in the y-direction, corresponding to the image type, and the image format information (image_format_specifier) is the appellation of the image type. The Reserved is constituted by an optional number of bits and is provided to render the number of bits of the entire capture command equal to a multiple of 4. By providing this Reserved, the resulting number of bits is convenient for the data unit in transmitting the packet conforming to the IEEE 1394 standard.

In the image_format_specifier, the image type appellation is classified by the values of the hexadecimal number (Value) as shown in FIG. 14, where "chunky" in the image type appellation denotes that the image is the still picture transmitted point-sequentially from the data conversion unit 13 to the printing device 5, whereas "liner" denotes that the image is the still picture transmitted line-sequentially from the data conversion unit 13 to the printing device 5.

In the image_format_specifier, there may be stored not only the appellation of the image type, as shown in FIG. 14, but also the appellation of the image type expressed in hex notation (values, sub-values) and which is devoid of the information pertinent to the number of pixels, as shown in FIG. 15, in distinction from the image type shown in FIG. 14. The number of pixels for printing on the printing device 5 is defined by the image_size_x stated in the operands [21] to [22] and image_size_y stated in operands [23] to [24] in the capture command shown in FIG. 12.

For example, if [00] in hex notation is stated in the msb of the image_format_specifier (meaning: sRGB raw), it indicates that RGB data as picture data is to be transmitted to the printing device 5. If [00] in hex notation is stated in the msb of the image_format_specifier, and [00] in hex notation is stated in its lsb (type: sRGB raw) then RGB data is transmitted in the sequence of R, G, B, R, G, B, . . . or in the sequence of R, G, B, 0, R, G, B, 0, . . . if [00] (Type: sRGB raw) in hex notation is stated in its lsb or if [01] (Type: sRGB raw, quadlet) in hex notation is stated in its lsb, respectively. That is, if [00] is stated in the msb, 0 data is transmitted between B and R so that R, G, B, 0 is transmitted as a one-unit 4-byte data.

If [01] (meaning: YCC raw) is stated in the msb of the image_format_specifier, it indicates that the picture data is to be transmitted as YCC data to the printing device 5. If [01] in hex notation is stated in the msb of the image_format_specifier, the luminance information and the chroma information are transmitted point-sequentially (chunky) as data of the 4:2:2 pixel format, data of the 4:2:2 pixel format is transmitted line-sequentially (liner), the luminance information and the chroma information are transmitted point-sequentially (chunky) as data of the 4:2:0 pixel format, and data of the 4:2:2 pixel format is transmitted line-sequentially (liner), if [0X] in hex notation, where X is an indefinite number (Type: YCC 4:2:2 raw/pixel), is stated in the lsb, if [1X] is stated in lsb (Type: YCC4:2:2 raw/line), if [8X] is stated in lsb (Type: YCC4:2:2 raw/chunky), or if [9X] is stated in lsb (Type: YCC4:2:0 raw/line), respectively.

If [01] in hex notation (meaning: YCC raw) is stated in the msb of the image_format_specifier and if [X0~XC] in hex notation is stated in the lsb, such data is transmitted in which the pixel ratio is specified (pixel ratio 1.00×1.00, pixel ratio 1.19×1.00 or pixel ratio 0.89×1.00), the color space is specified (ITU-R (International Telecommunications Union-Radiocommunication Sector) BT.709-2, ITU-R BT.601-4 or ITU-R BT.1203), point-sequential (chunky) or line-sequential (liner) transmission is specified. If [X0~X4] in hex notation is stated in the lsb, the interlaced picture is transmitted, whereas, if [X8~XC] in hex notation is stated in the lsb, the progressive picture is transmitted. If [X0~X2] and [X8~XA] are stated in the lsb, it indicates that data conforming to the ITU-R BT. 601 to 604 is transmitted. If [X4] and [XC] are stated in the lsb, it indicates that data conforming to the ITU-R BT. 1203 (PAL system) is transmitted.

If [10] in hex (meaning: DCF object) is stated in the msb of the image_format_specifier, it indicates that picture data is to be transmitted to the printing device 5 in a format prescribed in the digital camera (DCF: design rule for camera format). If [10] in hex notation is stated in the msb of the image_format_specifier, and [00] (Type: Exif 2.1) in hex notation is stated in the lsb, it indicates that data to be transmitted is the Exif type data, in which the picture portion is of the JPEG system and a header recording the photographing states or conditions is appended. If the lsb is [01] (Type: JFIF (JPEG file interplay format)) in hex, it indicates that the data of the JFIF type is to be transmitted. If the lsb is [02] (Type: TIFF (tag image file format)) in hex, it indicates that the data of the TIFF type is to be transmitted whereas, if the lsb is [0F] (Type: JPEG (joint photographic coding experts group)), it indicates that picture data is to be transmitted to the printing device 5 in the JPEG format.

If [80 to 8F] in hex is stated in the msb of the image format specifier, it indicates that the data is to be transmitted in accordance with a different format, and data of the format specified by the [00 to FF] stated in the lsb is transmitted.

In the image_format_specifier, it is also possible to set [FE] in hex (meaning: special meaning) in the msb, to set [00] (type: unit plug defined) dependent on the STB3 and the plug of the printing device 5 in the lsb and to set [01] (don't care) not specifying the data format, in distinction from the above-given example.

The data conversion unit 13 transmits the asynchronous packet 100, having stored therein the capture command, receives an ACK (acknowledge) from the printing device 5 and transmits the asynchronous packet 100 comprehending still picture data to the printing device 5.

The transmission rules for static image data are as shown in FIGS. 16 to 19.

FIG. 16 shows the transmission order of pixel data in point-sequential (chunky) transmission of static image data with a pixel format of YCC 4:2:2 to the printer device 5.

FIG. 17 shows the transmission order of pixel data in point-sequential (chunky) transmission of static image data with a pixel format of YCC 4:2:0 to the printer device 5.

FIG. 18 shows the transmission order of pixel data in line-sequential (liner) transmission of static image data with a pixel format of YCC 4:2:2 to the printer device 5.

FIG. 19 shows the transmission order of pixel data in line-sequential (liner) transmission of static image data with a pixel format of YCC 4:2:0 to the printer device 5.

In FIGS. 16 to 19, Yi(Lj) indicates luminance information Y having a pixel number i included in a line number j. The pixel number i used for designating the pixel of the luminance information Y has an integer value of 1 to N, and the line number j has an integer value of 1 to M. Cbi(Lj) indicates color-difference information Cb having a pixel number i included in a line number j. The pixel number i used for designating the pixel of the color-difference information Cb has a value of 1, 3, 5, . . . , N−1, and the line number j has an integer value of 1 to M in the case of YCC 4:2:2 or a value of 1, 3, 5, . . . , N−1 in the case of YCC 4:2:0. Cri(Lj) indicates color-difference information Cr having a pixel number i included in a line number j. The pixel number i used for designating the pixel of the color-difference information Cr has a value of 1, 3, 5, . . . , N−1, and the line number j has an integer value of 1 to M in the case of YCC 4:2:2 or a value of 1, 3, 5, . . . , N−1 in the case of YCC 4:2:0. N indicates the total number of pixels in one line. M indicates the total number of lines within one screen.

In this case, when point-sequentially (chunky) transmitting to the printer device 5 the static image data included in the asynchronous packet 100 having an image type of 480_422_4×3 shown in FIG. 14 and constituted by pixels with the pixels numbers 1 to 720 provided in the x-direction and the line numbers 1 to 480 provided in the y-direction, the data conversion section 13 transmits the pixel data as shown in FIG. 20.

Specifically, subsequent to the address offset (address_offset), the data conversion section 13 transmits the luminance information Y1(L1), luminance Y2(L1), color-difference information Cb1(L1) and color-difference information Cr1(L1) with respect to the pixel number 1 included in the line number 1. Then, subsequent to the pixel data up to the pixel number 720 included in the line number 1, the data conversion section 13 transmits the luminance information and color-difference information of the next line number 2 and subsequent line numbers. The data conversion section 13 transmits the pixel data up to the pixel number 720 included in the line number 480, thereby completing transmission of the static image data representing one static image.

When the image type is 480_420_4×3, the data conversion section 13 transmits the luminance information Y1(L1), luminance information Y2(L1), luminance information Y1(L2) and luminance information Y2(L2) with respect to the pixel number 1 included in the line number 1 subsequent to the address offset (address_offset), and then transmits the color-difference information Cb1(L1), color-difference information Cr1(L1), luminance information Y3(L1) and luminance information Y4(L1) included in the pixel data of the pixel number 1, as shown in FIG. 21. Then, the data conversion section 13 transmits the pixel data up to the pixel number 720 included in the line number 480, thereby completing transmission of the static image data representing one static image.

When line-sequentially transmitting the static image data having the image type of 480_422_4×3 included in the asynchronous packet 100, the data conversion section 13 transmits the luminance information Y1(L1), luminance information Y2(L1), luminance information Y3(L1), luminance information Y4(L1), . . . , luminance information Y720(L1) with respect to the line number 1 subsequent to the address offset (address_offset), and then transmits the color-difference information Cb1(L1), color-difference information Cr1(L1), . . . , color-difference information Cb720(L1) and color-difference information Cr720(L1) with respect to the line number 1, as shown in FIG. 22. Then, the data conversion section 13 transmits the luminance information and color-difference information of the line number 2 and subsequent line numbers, and transmits the color-difference information Cr720(L480) of the line number 480, thereby completing transmission of the static image data.

When line-sequentially transmitting the static image data having the image type of 480_420_4×3 included in the asynchronous packet 100, the data conversion section 13 first transmits the luminance information Y1(L1) to luminance information Y720(L1) of the line number 1, the transmits the luminance information Y1(L2) to luminance information Y720(L2) of the line number 2, and then transmits the color-difference information Cb1(L1), color-difference information Cr1(L1) to color-difference information Cb720(L1), color-difference information Cr719(L1) of the line number 1, thus transmitting the pixel data of the line number 1 and the line number 2, as shown in FIG. 23. Then, the data conversion section 13 transmits the luminance information and color-difference information of the line number 3 and subsequent line numbers, and transmits the color-difference information Cb719(L479) and color-difference information Cr719(L479), thereby completing transmission of the static image data.

Figure 24:
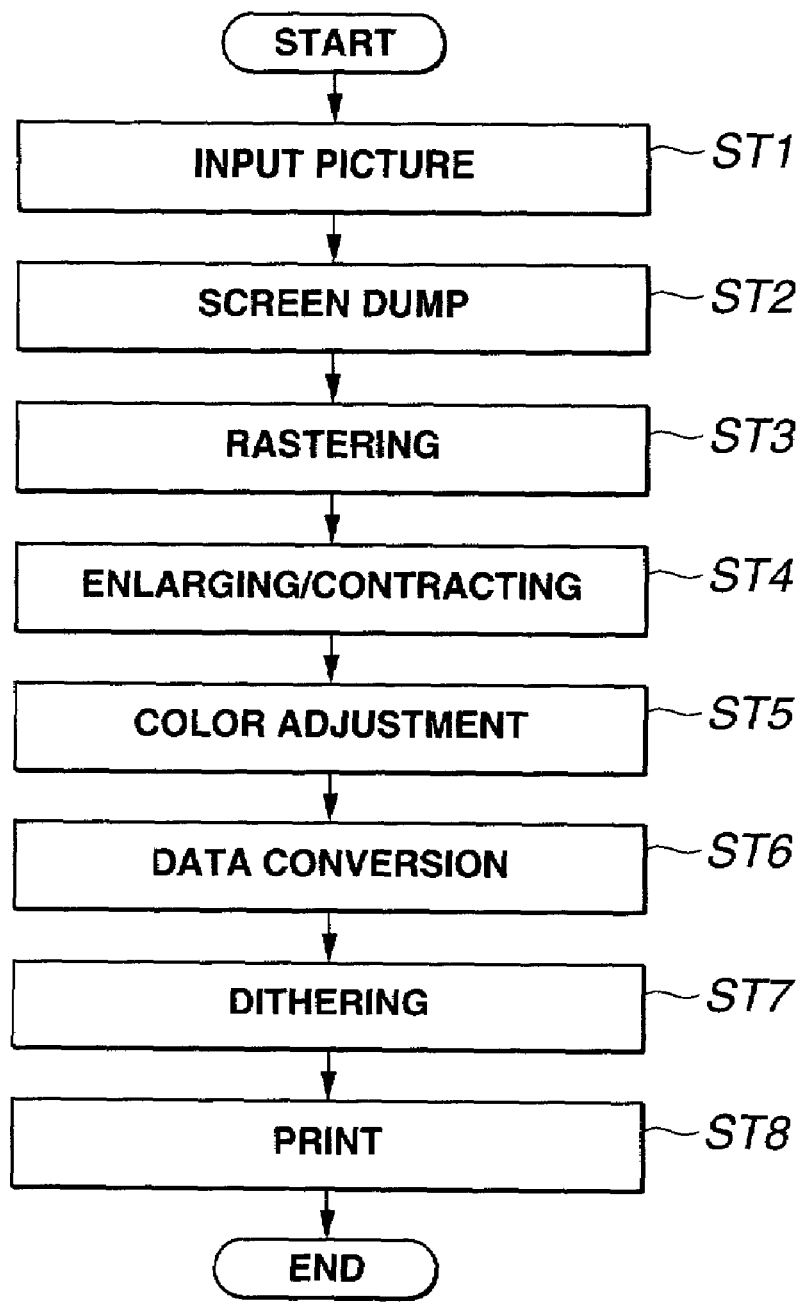
FIG. 24 is a flowchart for illustrating the printing sequence performed by the p4 making up a picture printing system embodying the present invention.

The processing contents conforming to the printing control program on the printing device 5 is explained by referring to the flowchart of FIG. 24.

The CPU 35 performs processing shown in FIG. 24 according to the printing control program.

In FIG. 24, the data input unit 31 of the printing device 5 at step ST1 is fed from the data conversion unit 13 with a packet generated in accordance with the IEEE 1394 standard. The data input unit 31 performs the processing in the transaction layer, link layer and in the physical layer, in accordance with the IEEE 1394 standard, to extract the still picture data which is the YCC picture made up of the luminance information Y and the chroma information Cr and Cb.

At the next step ST2, the CPU 35 performs screen dumping for printing all of what is displayed on the entire screen of the television device 4.

At the next step ST3, the CPU 35 performs rastering on the still picture data screen-dumped at step ST2. That is, the CPU 35 performs the processing of converting the still picture data into dot form for transferring the data to the print engine 33.

At the next step ST4, the CPU 35 performs enlargement/contraction processing on the still picture data rastered at the above step ST3. That is, the CPU 35 performs the processing of changing the printing size of the still picture within a range specified by the user.

At the next step ST5, the CPU 35 adjusts the color of the still picture data enlarged/contracted at the above step ST4 to prepare printing data of R (red), G (green) and B (blue).

The relational expression of a pixel value with the color space designated in the Y (ITU-R BT.601-4) format and a pixel value with the color space designated by RGB is described as follows.

$$Y'_{601YCC} = 0.299 * R'_{RGB} + 0.587 * G'_{RGB} + 0.144 * B'_{RGB}$$

$$Cr'_{601YCC} = 0.713 * (R'_{RGB} - Y'_{601YCC})$$
$$= 0.500 * R'_{RGB} - 0.419 * G'_{RGB} - 0.081 * B'_{RGB}$$

$$Cb'_{601YCC} = 0.564 * (B'_{RGB} - Y'_{601YCC})$$
$$= -0.169 * R'_{RGB} - 0.331 * G'_{RGB} + 0.500 * B'_{RGB}$$

As an 8-bit value, these can be expressed as follows.

$$Y'_{601YCC\_8bit} = (219.0 * Y'_{601YCC}) + 16.0$$

$$Cb'_{601YCC\_8bit} = (224.0 * Cb'_{601YCC}) + 128.0$$

$$Cr'_{601YCC\_8bit} = (224.0 * Cr'_{601YCC}) + 128.0$$

This 8-bit value is transmitted as image data from the STB 3 to the printer device 5, and the 8-bit YCC value is converted to RGB at step ST5.

The relational expression of a pixel value with the color space designated in the Y (ITU-R BT.709-2) format and a pixel value with the color space designated by RGB is described as follows.

$$Y'_{709YCC} = 0.2126 * R'_{RGB} + 0.7152 * G'_{RGB} + 0.0722 * B'_{RGB}$$

$$Cb'_{709YCC} = 0.5389 * (B'_{RGB} - Y'_{709YCC})$$

$$Cr'_{709YCC} = 0.6350 * (R'_{RGB} - Y'_{709YCC})$$

As an 8-bit value, these can be expressed as follows.

$$Y'_{709YCC\_8bit} = (219.0 * Y'_{709YCC}) + 16.0$$

$$Cb'_{709YCC\_8bit} = (224.0 * Cb'_{709YCC}) + 128.0$$

$$Cr'_{709YCC\_8bit} = (224.0 * Cr'_{709YCC}) + 128.0$$

This 8-bit value is transmitted as image data from the STB 3 to the printer device 5, and the 8-bit YCC value is converted to RGB at step ST5.

At the next step ST6, the CPU 35 converts the color-adjusted picture data of R, G and B into respective colors of cyan, magenta and yellow to decide the proportions of the cyan, magenta and yellow in each dot. The CPU 35 then performs dithering at step ST7.

Next, at step ST8, the CPU 35 outputs the dithered printing data to the print engine 33 to drive the print engine 33 to perform printing processing of drawing a picture on the support.

Figure 25:
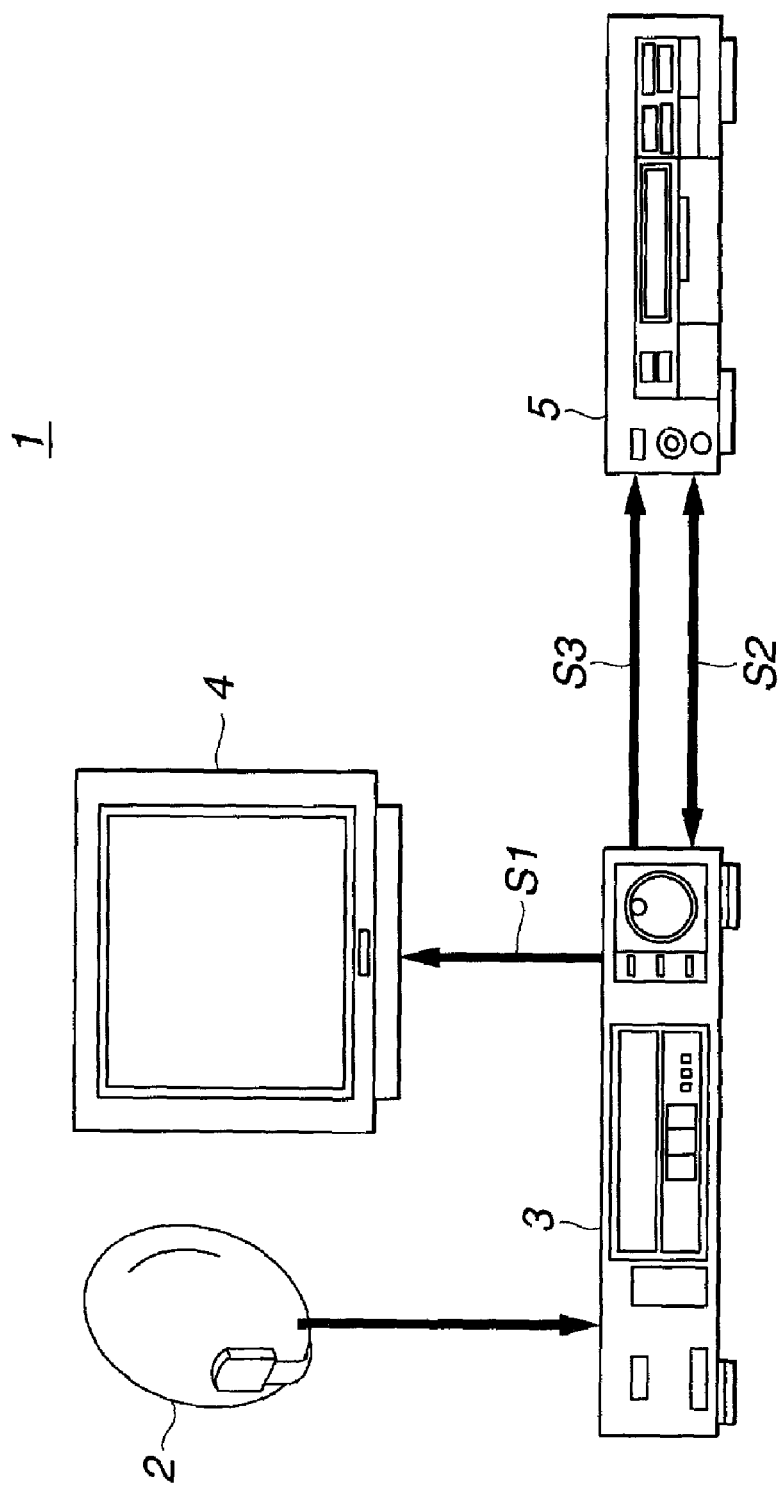
FIG. 25 illustrates the processing sequence for printing by a printing device of the picture printing system embodying the present invention.

In the picture printing system 1, configured as discussed above, the processing of the CPU 23 in printing picture data received at the STB 3 by the printing device 5 is explained with reference to FIGS. 25 and 26.

Figure 26:
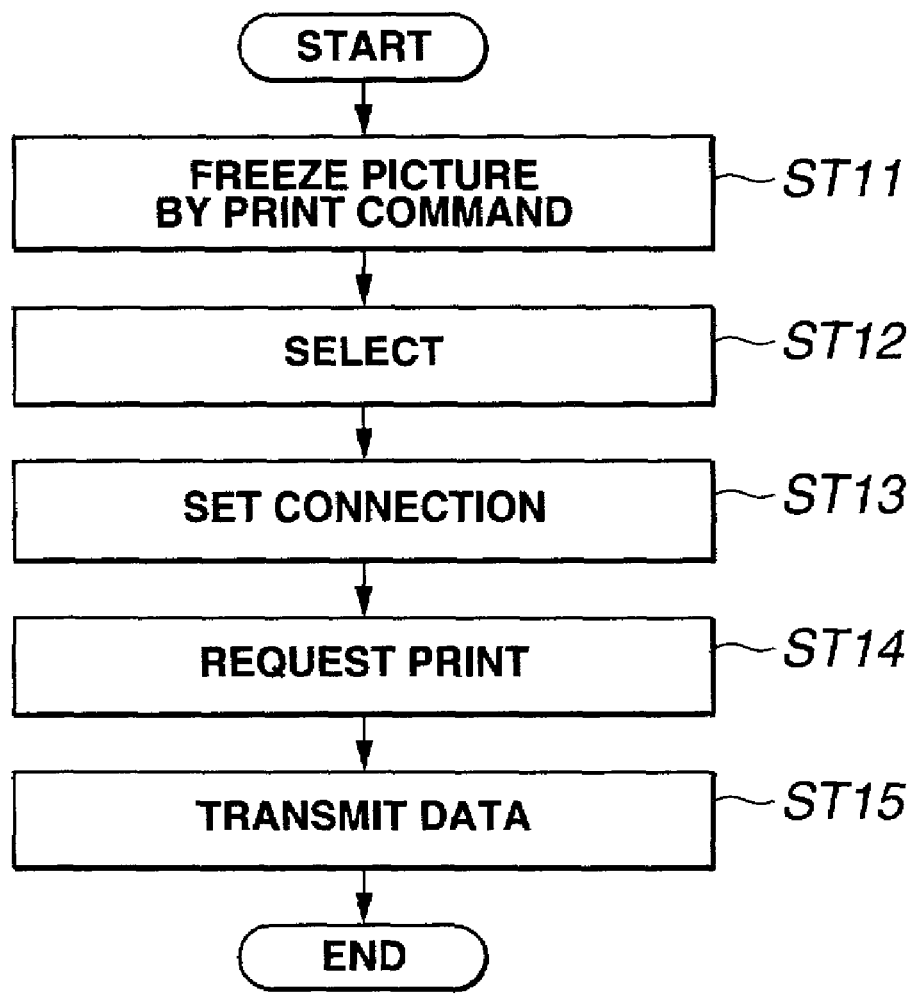
FIG. 26 is a flowchart for illustrating the processing sequence of the STB in printing a picture displayed on the television device by a printing device.

In the flowchart shown in FIG. 26, the CPU 23 of the STB 3 is fed at step ST11 with an operating input signal of freezing the moving picture displayed on the television device 4, by the user acting on the operating button provided on the STB 3. The CPU 23 is responsive thereto to control the display controller 19 to halt the outputting (S1 in FIG. 25) of the moving picture data from the NTSC encoder 18 to the television device 4 to demonstrate the still picture on the television device 4.

If, at the next step ST12, the operating input signal of selecting the frame-based still picture data, frozen at the above step ST11 and demonstrated on the television device 4, to print the picture data on the printing device 5, is fed to the CPU 35 from the operating input unit 21, the CPU 25 controls the display controller 19, MPEG processor 16 and the demultiplexer 14 to read-in the frame-based still picture data stored in the display memory 20 in the picture memory 15. This permits the CPU 35 to store the still picture data, made up of the luminance information Y and the chroma information Cr, Cb, in the picture memory 15.

At the next step ST13, the CPU 35 controls the data conversion unit 13 to establish the interconnection between the STB 3 and the printing device 5 in accordance with the IEEE 1394 standard. That is, when fed with the control signal for establishing the interconnection from the CPU 35, the data conversion unit 13 generates a command packet (S2) to effect plug recognition between it and the data input unit 31. At this time, the data input unit 31 of the printing device 5 sends a command packet, having stored therein the information indicating the source plug, to the data conversion unit 13. The data input unit 31 of the printing device 5 transmits to the data conversion unit 13 a command packet (S2), having stored therein the information indicating the destination plug for making asynchronous connection on recognition of the information indicating the source plug, to the data conversion unit 13. This allows the data conversion unit 13 to recognize the information indicating the destination plug of the data input unit 31 of the printing device 5, while allowing the data input unit 31 to recognize the information indicating the source plug of the data conversion unit 13 of the STB 3.

At the next step ST14, the CPU 23 demands the printing device 5 of the printing size, direction and position as well as the number of printing sheets in printing the still picture.

At the next step ST15, the CPU 23 controls the demultiplexer 14 and the data conversion unit 13 to output the still picture data to the printing device 5 for printing thereby to generate a data packet (S2) comprehending the still picture data stored in the picture memory 15 to transmit the data packet to the printing device 5.

If the printing device 5 has received plural data packets, inclusive of the information indicating the destination plug, and so has verified that the entire still picture data has been received, the printing device 5 performs the processing shown in FIG. 15, under control by the CPU 35, to print the picture indicated by the still picture data in accordance with the specified printing size and so forth.

Figure 27:
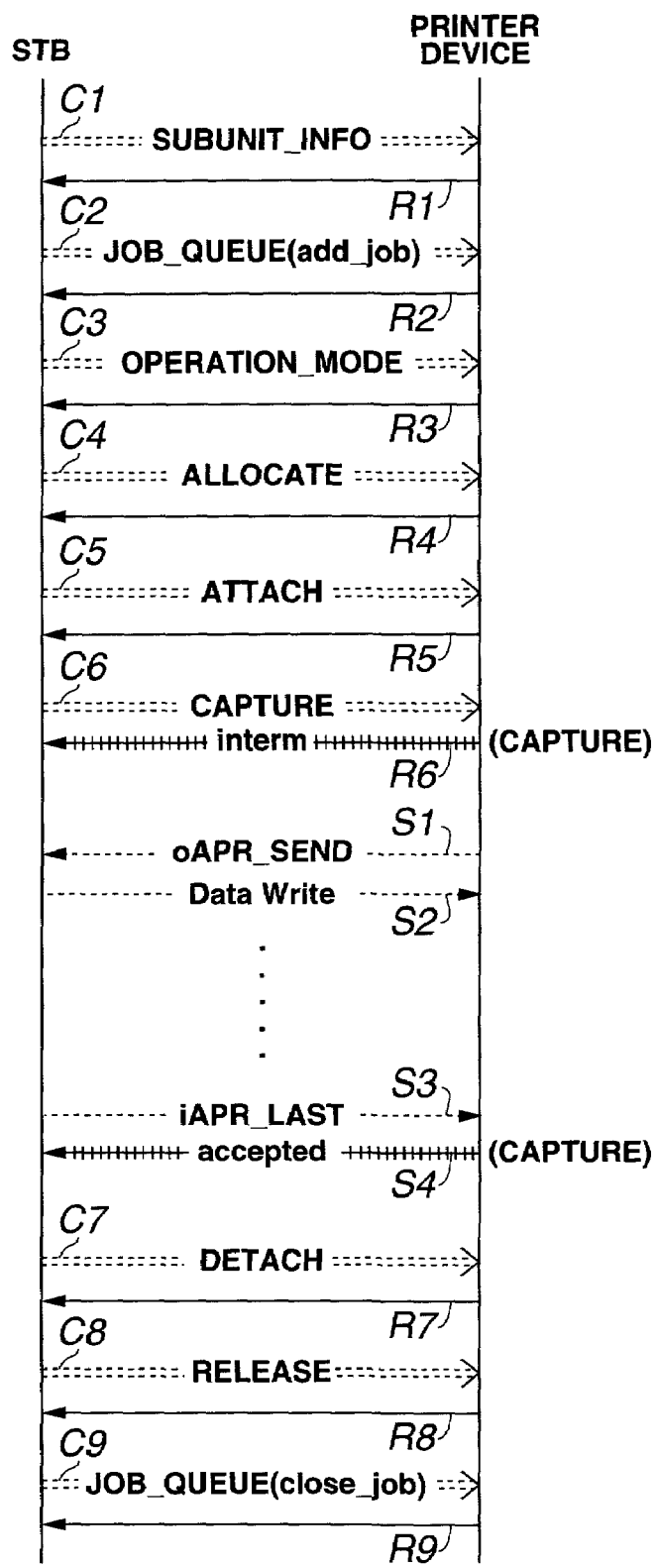
FIG. 27 shows a processing sequence of transmitting/receiving an asynchronous packet between a data outputting unit and a data input unit for transmitting still picture data from the data outputting unit to the data input unit.

An instance of transimitting/receiving the asynchronous packet 100 between the STB 3 and the printing device 5 to cause the printing device 5 to print the printing data (still picture data) is now explained with reference to FIG. 27.

In this figure, the data conversion unit 13 of the STB 3 first transmits to the data input unit 31 a command packet C1, inclusive of a command (SUBUNIT_INFO) inquiring into the information as to the status of the data destination subunit (data input unit 31) and receives a response packet R1 indicating the search result. This permits the data input unit 31 to recognize that the destination of the data is the printing device accommodating the AV/C command.

The data conversion unit 13 then prepares a capture command C2, inclusive of a version command, to the data input unit 31, to receive the response packet R2 indicating the search result. This permits the data input unit 31 to recognize the contents supported by the printing device 5 and the image size and type of picture data in transmitting subsequent picture data. The STB 3 is responsive to the contents of the response packet R2 associated with the command packet C2 to check whether or not the printing device 5 is able to print with an image with which the printing device 5 is desirous to effect the printing.

Then, before proceeding to data transmission, the data conversion unit 13 sends a command packet (JOB_QUEUE) to the printing device 5 to indicate that there is a job of printing a still picture and receives the corresponding response packet R3.

The data conversion unit 13 then transmits to the printing device 5 a command packet C4 specifying the operational mode (OPERATION MODE) specifying the printing setting, such as type or size of the printing sheet, printing quality or color (monochromatic/color) or printing position in printing by the printing device 5, and receives a corresponding response packet R4.

The data conversion unit 13 sets a plug for transmitting printing data to the data input unit 31. That is, the STB 3 transmits to the data input unit 31 a command packet C1, having stored therein a plug allocation (ALLOCATE) command, in order to set the destination plug, and receives a corresponding response packet R5.

Th data conversion unit 13 also transmits a command packet C6, having stored therein a connection setting (ATTACH) command, indicating that a plug for receiving a data packet comprehending printing data for printing by the printing device 5 is to be set to effect data packet transmission/reception, and acquires a corresponding response packet R6.

The data conversion unit 13 then sets the subfunction to Receive to transmit a command packet C7 comprehending a capture command requesting the data input unit 31 to receive the printing data. The command packet C7 has stored therein the information indicating a source plug of the data conversion unit 13 (source_plug). The data input unit 31 is responsive thereto to transmit to the data conversion unit 13 a response packet (Interim) R7 indicating that the result cannot be returned immediately to the data conversion unit 13.

The data input unit 31 then transmits to the data conversion unit 13 a packet S1 comprehending the information that the oAPR (output Asynchronous Port Register) indicating a port for asynchronously transmitting the printing data from the data conversion unit 13. The packet S1 has stored therein the information specifying the destination plug of the data input unit 31 (dest_plug).

The data conversion unit 13 then transits to the data input unit 31 a data packet S2 having stored therein the printing data in its data part 102. The data conversion unit 13 divides the printing data into pre-set data portions to transmit plural data packets S2. The data conversion unit 13 comprehends picture data of the image size and image type corresponding to the search results recognized by the contents of the response packet R2 in the data packet S2.

When transmission of the entire still picture data is finished, the data conversion unit 13 transmits to the data input unit 31 a command packet S3 comprehending the information pertinent to the iAPR (input Asynchronous Port Register) of the flow control register of the source plug.

The data input unit 31 then transmits to the data conversion unit 13 a response packet S3 (accepted) indicating acceptance of the command packet C7 comprehending the capture command.

The data conversion unit 13 is responsive thereto to transmit the command packet C8, comprehending a disconnection (DETACH) to the data input unit 31 of the printing device 5 to acquire a response packet R9 from the data input unit 31.

The data conversion unit 13 transmits to the data input unit 31 of the printing device 5 a command packet C9 comprehending the disconnection (RELEASE) to acquire a response packet R9 from the data input unit 31.

The data conversion unit 13 then transmits a command packet (JOB_QUEUE) C10, indicating the end of the sequence indicating the job of printing a still picture to acquire a corresponding response packet R10.

The STB 3, doing this processing, checks, depending on the contents of the response packet R2 to the command packet C2, whether or not the printing device 5 is able to perform printing with an image the STB 3 itself desires and, if printing is impossible, the STB 3 sequentially transmits to the printing device 5 a command for checking whether or not the image size it desires is coped with and a command whether or not the image type it desires, to perform the processing for acquiring the results of search contained in the response packet.

With the picture printing system 1, performing the above processing, it is possible to recognize the image size and the image type supported by the printing device 5 at the outset by transmitting the command packet C2 comprehending the version command to the printing device 5 to check into the profile type supported by the printing device 5, while it is possible to recognize plural supporting states, such as the image size or the image type to acquire the profile of the printing device 5 extremely readily.

With this picture printing system 1, it is moreover possible to define the profile by the STB 3, that is on the data source side, to make printing setting to suppress the difference in the printable images dependent on the printer type. This enables the picture printing system 1 to absorb difference in interconnectability among printing devices of different types to achieve mounting of the data source, that is the control device.

Although the STB 3 and the printing device 5 are interconnected in the above embodiment, the present invention is applicable to a case wherein other equipment are interconnected.

Although the data conversion unit 13 and the data input unit 31 as interfacing circuits conforming to IEEE 1394 standard are provided on the STB 3 and on the printing device 5, respectively, the interfacing circuit may also be any suitable different interfacing circuit, such as USB. That is, with the picture printing system 1 having the STB 3 and the printing device 5 including the USB, it is possible to transmit/receive packets between the STB 3 and the printing device 5 by a digital system to have a fine picture printed by the printing device 5.

INDUSTRIAL APPLICABILITY

In the data reception and transmission devices, in the data processing method and in the data transmission/reception system, described above, in which a command packet for checking into the profile is transmitted to the data reception side and the profile information as search result is transmitted from the data reception side to the data source side, processing in a shorter time may be achieved without the necessity of checking into the support state of the data reception side a plurality of number of times.

The invention claimed is:

1. A data reception apparatus comprising:
   picture processing means for doing pre-set picture processing using picture data from a data source side;
   input/output means for being fed from said data source side with picture data comprehended in a packet conforming to the IEEE (The Institute of Electrical and Electronics Engineers) 1394 standard and for outputting a response packet responsive to a command packet conforming to the IEEE 1394 standard from the data source side; and
   control means for controlling said input/output means to transmit to said data source side the profile information indicating a profile coped with by said picture processing means, as search results, responsive to the inputting of a command for searching a profile to said input/output means,
   wherein the control means determines whether to modify the type of picture data from the data source side to the input/output means based on whether the input/output means can accommodate the picture data,
   wherein the control means transmits the picture data from the picture processing means only when the profile as a premise for transmitting the picture data is met, and
   wherein the profile information is divided into the minimum setting information, digital still camera (DSC) setting information, digital television (DTV) setting information, DSC and DTV setting information.

2. A data processing method in doing pre-set picture processing using picture data from a data source side, comprising:
   a step of being fed from said data source side with picture data comprehended in a packet conforming to the IEEE (The Institute of Electrical and Electronics Engineers) 1394 standard;
   a step of outputting a response packet responsive to a command packet conforming to the IEEE 1394 standard from the data source side;
   a step of transmitting to said data source side the profile information indicating a profile coped with, as search results, responsive to the inputting of a command packet for searching the profile of processable picture data; and
   a step of determining whether to transmit the picture data from the data source side based on the profile information,
   wherein the picture data from the data source side is transmitted only when the profile as a premise for transmitting the picture data is met, and
   wherein the profile information is divided into the minimum setting information, digital still camera (DSC) setting information, digital television (DTV) setting information, DSC and DTV setting information.

3. A data transmission device comprising:
   picture processing means for processing picture data input from outside to generate picture data;
   input/output means for outputting the picture data generated by said picture processing means as the picture data is comprehended in a packet conforming to the IEEE (The Institute of Electrical and Electronics Engineers) 1394 standard; and
   control means for managing control for generating a command packet for searching a profile coped with by picture data outputting destination to output the generated command packet from said input/output means to a data reception side, said control means also managing control for changing the type of the picture data output by said input/output means based on the profile information specifying the search results from said data reception side,
   wherein the control means determines whether to modify the type of picture data from said outside to the input/output means based on whether the input/output means can accommodate the picture data,
   wherein the control means transmits the picture data from the picture processing means only when the profile as a premise for transmitting the picture data is met, and
   wherein the profile information is divided into the minimum setting information, digital still camera (DSC) setting information, digital television (DTV) setting information, DSC and DTV setting information.

4. A data processing method comprising:
   a step of processing picture signals input from outside to generate picture data;
   a step of outputting the picture data generated as the picture data is comprehended in a packet conforming to the IEEE (The Institute of Electrical and Electronics Engineers) 1394 standard;
   a step of generating a command packet for searching a profile coped with by picture data outputting destination to output the generated command packet to a data reception side;
   a step of managing control for changing the type of the picture data output based on the profile information specifying the search results transmitted from said data reception side; and
   a step of determining whether to transmit the picture data from said outside based on the profile information,
   wherein the picture data from the data source side is transmitted only when the profile as a premise for transmitting the picture data is met, and
   wherein the profile information is divided into the minimum setting information, digital still camera (DSC) setting information, digital television (DTV) setting information, DSC and DTV setting information.

5. A data transmission/reception system having a data transmission device and a data reception device; said data transmission device comprising:
   first picture processing means for processing picture signals input from outside to generate picture data;
   first input/output means for outputting the picture data generated by said first picture processing means to a picture reception device as the picture data generated is comprehended in a packet conforming to the IEEE (The Institute of Electrical and Electronics Engineers) 1394 standard; and
   first control means for managing control for generating a command packet for searching a profile coped with by picture data reception device to output the generated command packet from said input/output means to said data reception device, said control means also managing control for changing the type of the picture data output by said first input/output means based on the profile information specifying the search results from a data reception side;

said data reception device including second input/output means for receiving picture data from said first input/output means as the picture data is comprehended in a packet conforming to the IEEE (The Institute of Electrical and Electronics Engineers) 1394 standard, and for outputting a response packet responsive to the command packet conforming to the IEEE (The Institute of Electrical and Electronics Engineers) 1394 standard from said first input/output means;

second picture processing means for performing pre-set picture processing using the picture data input by said first picture processing means; and second control means for controlling said second input/output means, responsive to inputting to said second input/output means a command for searching a profile from said second input/output means and for outputting the profile information indicating the profile coped with by said second picture processing means, as search results, to said data transmission device, wherein the first control means transmits the picture data from the picture processing means only when the profile as a premise for transmitting the picture data is met, and wherein the profile information is divided into the minimum setting information, digital still camera (DSC) setting information, digital television (DTV) setting information, DSC and DTV setting information.

6. A data reception apparatus comprising:

a picture processing section for doing pre-set picture processing using television picture data from a television signal reception side;

an input/output section fed from said television signal reception side with said television picture data comprehended in an FCP (Function Control Protocol) packet conforming to the IEEE (The Institute of Electrical and Electronics Engineers) 1394 standard and for outputting a response packet responsive to a command packet conforming to the IEEE 1394 standard from the television signal reception side; and a controller for controlling said input/output section to transmit to said television signal reception side profile information indicating a profile coped with by said picture processing section, as search results, responsive to the inputting of a version command packet for searching a profile of printable picture data to said input/output section, wherein the controller determines whether to modify the type of picture data from the television signal reception side to the input/output section based on whether the input/output section can accommodate the picture data, wherein the picture data from the television signal reception side is transmitted only when the profile as a premise for transmitting the picture data is met, and wherein the profile information is divided into the minimum setting information, digital still camera (DSC) setting information, digital television (DTV) setting information, DSC and DTV setting information.

7. A data transmission device comprising:

a picture processing section for picture-processing television data input from outside to generate picture data;

an input/output section for outputting the picture data generated by said picture processing section as the picture data is comprehended in an FCP (Function Control Protocol) packet conforming to the IEEE (The Institute of Electrical and Electronics Engineers) 1394 standard; and a controller for managing control for generating a version command packet for searching a profile of printable picture data coped with by a data reception device as picture data outputting destination to output the generated version command packet from said input/output section to the data reception device side, said controller also managing control for changing the type of the picture data output by said input/output section based on profile information specifying the search results from said data reception device side, wherein the television data from the picture processing section is transmitted only when the profile as a premise for transmitting the television data is met, and wherein the profile information is divided into the minimum setting information, digital still camera (DSC) setting information, digital television (DTV) setting information, DSC and DTV setting information.

* * * * *